(12) United States Patent
Braaten et al.

(10) Patent No.: US 10,583,373 B2
(45) Date of Patent: Mar. 10, 2020

(54) METHOD AND DEVICE FOR SEPARATION OF LIQUIDS AND GAS WITH USE OF INCLINED AND ROUNDED HOLES OR CHANNELS IN THE WALL OF A PIPE

(71) Applicant: FLUIDSEP AS, Trondheim (NO)

(72) Inventors: Nils A Braaten, Trondheim (NO); Lars Nøkleberg, Fornebu (NO); Gisle Onsrud, Åmotfors (SE); Terje Søntvedt, Gjettum (NO); Bjarne Agnar Olsen, Bergen (NO)

(73) Assignee: Fluidsep AS, Trondheim (NO)

( * ) Notice: Subject to any disclaimer, the term of this patent is extended or adjusted under 35 U.S.C. 154(b) by 0 days.

(21) Appl. No.: 15/371,035

(22) Filed: Dec. 6, 2016

(65) Prior Publication Data
US 2018/0154282 A1    Jun. 7, 2018

(51) Int. Cl.
  *B01D 17/02* (2006.01)
  *B01D 19/00* (2006.01)
  *B01D 17/04* (2006.01)

(52) U.S. Cl.
  CPC ....... *B01D 17/0214* (2013.01); *B01D 17/045* (2013.01); *B01D 19/0042* (2013.01)

(58) Field of Classification Search
  CPC ............ B01D 17/0214; B01D 19/0042; B01D 17/045; C02F 3/22; C02F 11/00; C02F 11/12; F16L 9/18; F16L 9/19; F16L 9/20; F16L 39/005
  See application file for complete search history.

(56) References Cited

U.S. PATENT DOCUMENTS

| 4,027,407 A * | 6/1977 | Kiss ....................... B63H 11/12 37/321 |
| 5,047,146 A * | 9/1991 | Bastenhof .............. B01D 24/24 210/97 |
| 6,277,286 B1 * | 8/2001 | Søntvedt ............ B01D 17/0208 166/250.03 |
| 6,868,907 B2 * | 3/2005 | Homstvedt ........ B01D 17/0208 166/265 |
| 6,875,247 B2 * | 4/2005 | TeGrotenhuis ......... B01B 1/005 165/60 |

(Continued)

FOREIGN PATENT DOCUMENTS

| CA | 2283741 A1 * | 9/1998 | ......... B01D 17/0208 |
| NO | 20001954 A | 10/2001 | |

(Continued)

*Primary Examiner* — Pamela H Weiss
(74) *Attorney, Agent, or Firm* — Alix, Yale & Ristas, LLP

(57) ABSTRACT

The present invention is directed to both a method for ensuring optimal conditions for separation, and a separator device for extraction of water, oil and gas from a mixture of water-oil-gas flowing in a straight pipe or straight channel. A separator comprises a certain length of pipe with diameter larger than or equal an inlet pipe and several inclined and profiled holes along the separator pipe wall. Holes in the pipe wall at the bottom of the pipe are provided for extraction of water, and one or more groups of inclined holes in the pipe wall at the top of the pipe are provided for extraction of oil and possible gas. Water and oil/gas are separated such that dispersed flow in the inlet is reduced to velocity equal or less than that of the separated flow at the outlet of the separator.

18 Claims, 20 Drawing Sheets

(56) References Cited

U.S. PATENT DOCUMENTS

| | | | | |
|---|---|---|---|---|
| 7,344,576 B2 * | 3/2008 | TeGrotenhuis | ......... | B01B 1/005 165/60 |
| 7,610,775 B2 * | 11/2009 | Tonkovich | ............. | B01D 3/146 62/617 |
| 8,555,978 B2 * | 10/2013 | Ganelin | .................. | E21B 17/01 166/344 |
| 9,790,778 B2 * | 10/2017 | Bakke | ...................... | E21B 43/36 |
| 2002/0059866 A1 | 5/2002 | Grant et al. | | |
| 2003/0141057 A1 * | 7/2003 | Homstvedt | ........ | B01D 17/0208 166/265 |
| 2004/0069494 A1 * | 4/2004 | Olsen | .................... | E21B 43/121 166/357 |
| 2011/0253640 A1 * | 10/2011 | Berard | ............... | B01D 19/0042 210/746 |
| 2012/0125836 A1 * | 5/2012 | Hintz | ..................... | B03D 1/245 210/511 |
| 2015/0204180 A1 * | 7/2015 | Bakke | .................... | E21B 43/36 95/254 |
| 2016/0327419 A1 * | 11/2016 | Hellevang | ................. | G01F 1/66 |
| 2016/0348490 A1 * | 12/2016 | Holm | ................ | B01D 19/0042 |

FOREIGN PATENT DOCUMENTS

| | | | | |
|---|---|---|---|---|
| NO | | 321386 B1 | 5/2006 | |
| RU | | 2581589 C1 * | 4/2016 | |
| WO | WO-9841304 A1 * | | 9/1998 | ......... B01D 17/0208 |
| WO | WO-0201044 A1 * | | 1/2002 | ........ B01D 17/0208 |
| WO | WO-03062597 A1 * | | 7/2003 | ......... B01D 17/0208 |

\* cited by examiner

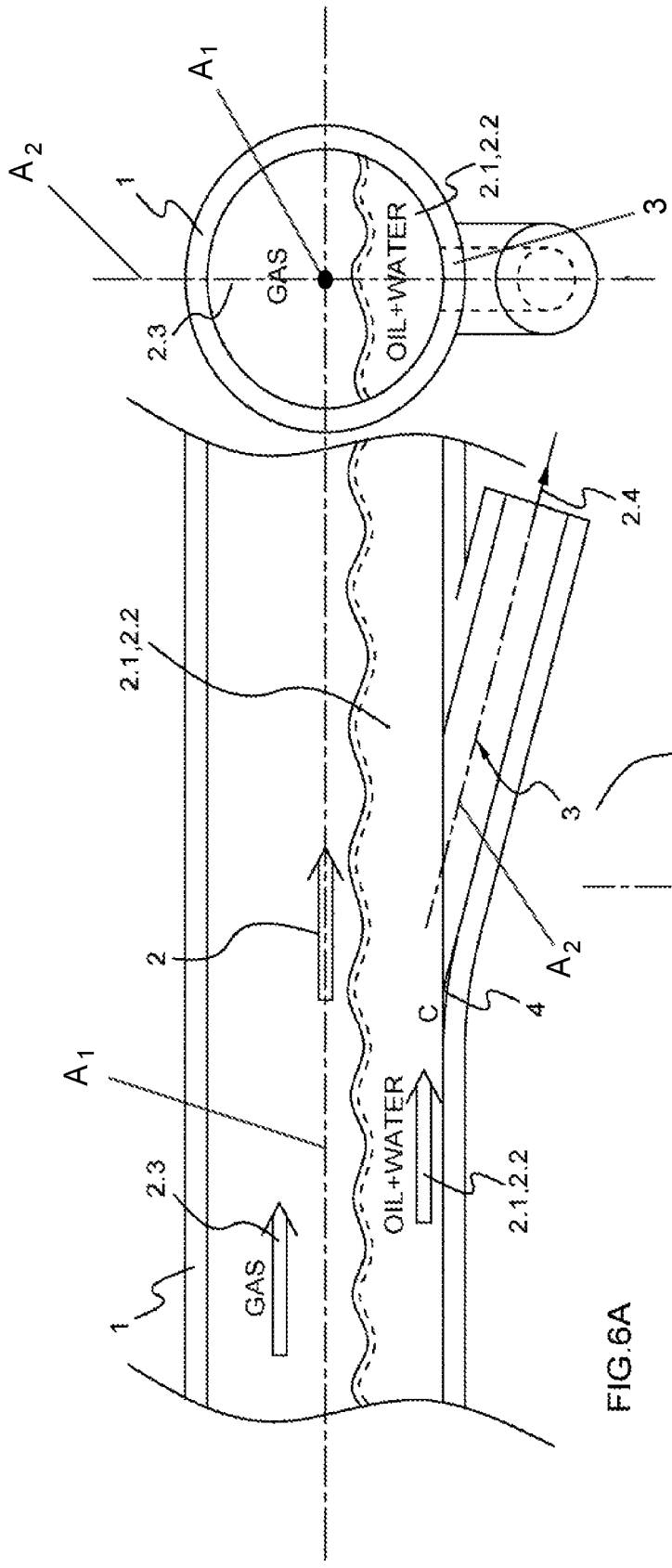
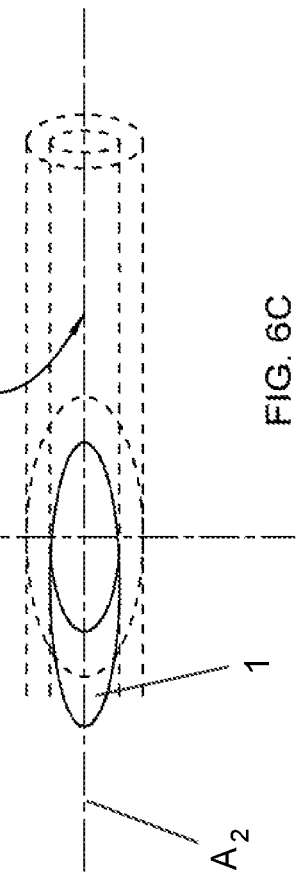
FIG. 6A
FIG. 6B
FIG. 6C

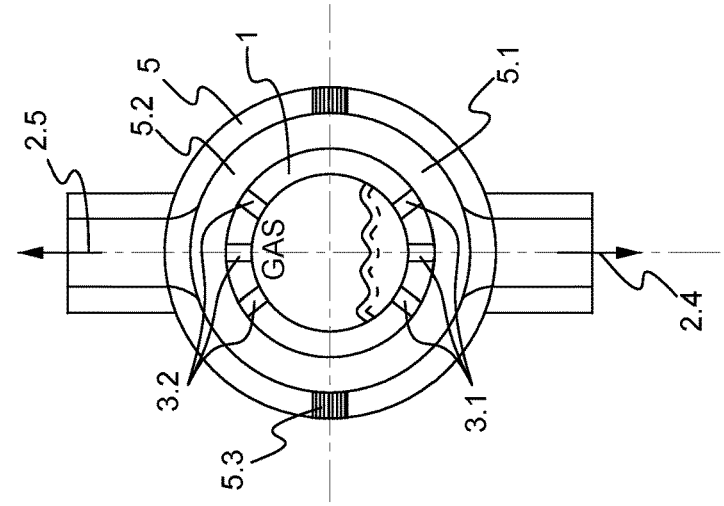
FIG. 7B
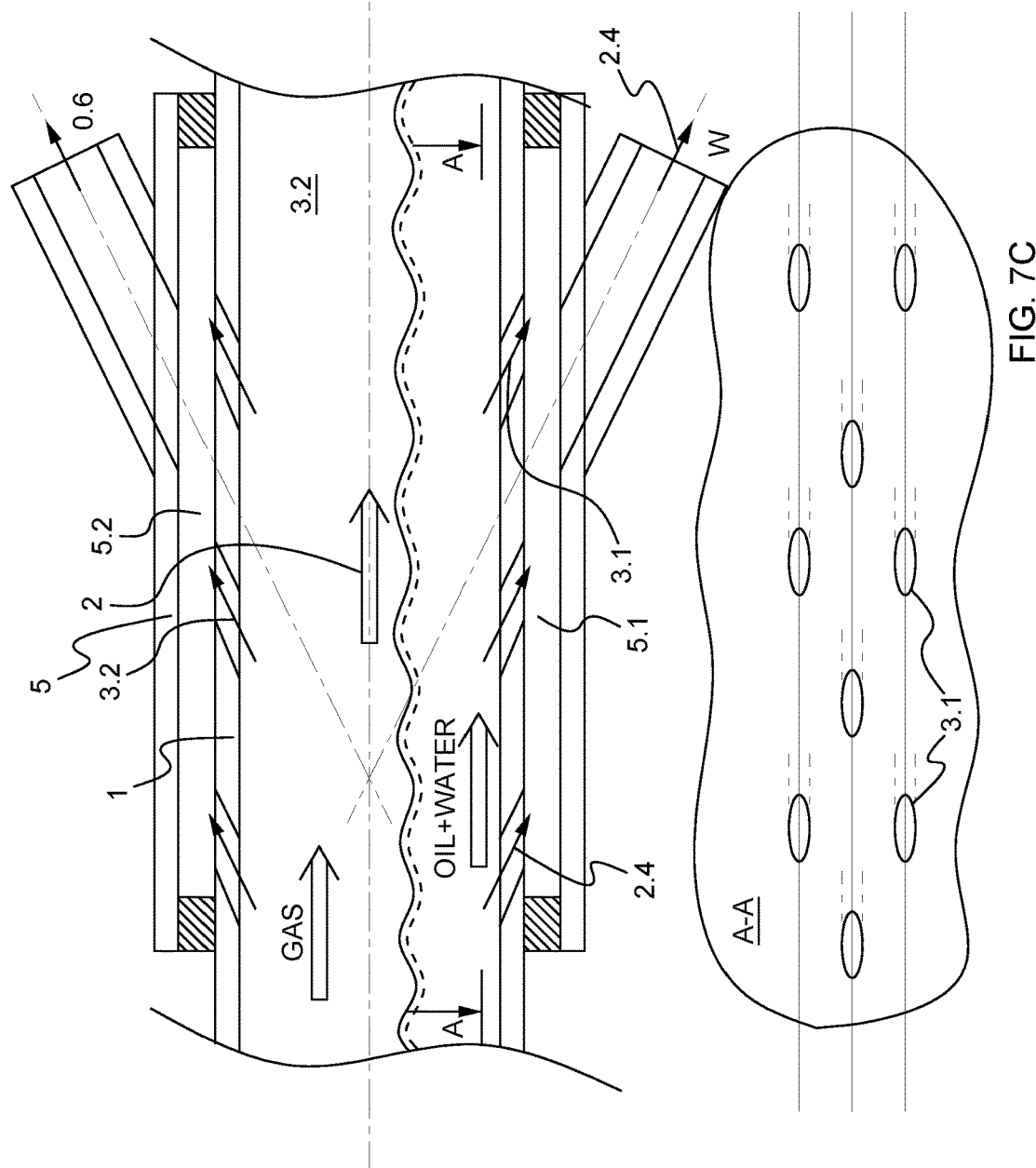
FIG. 7A
FIG. 7C

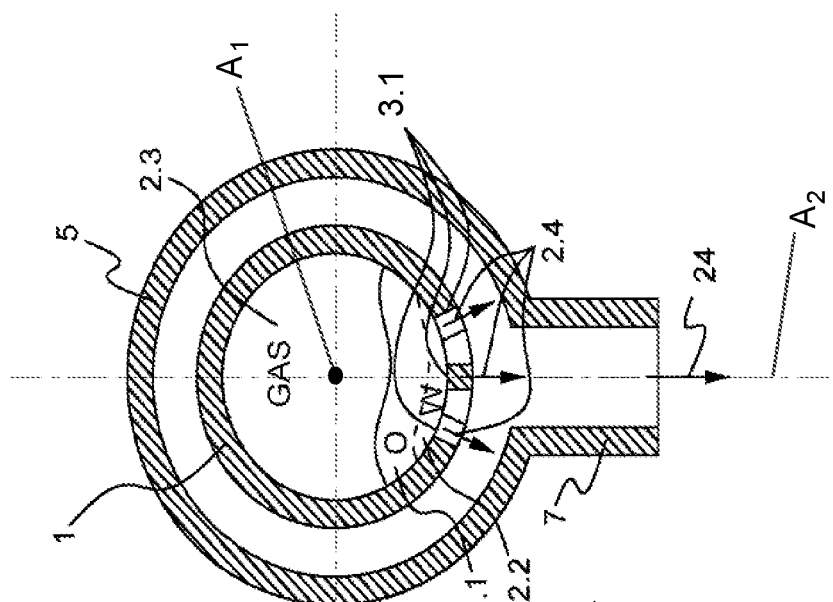
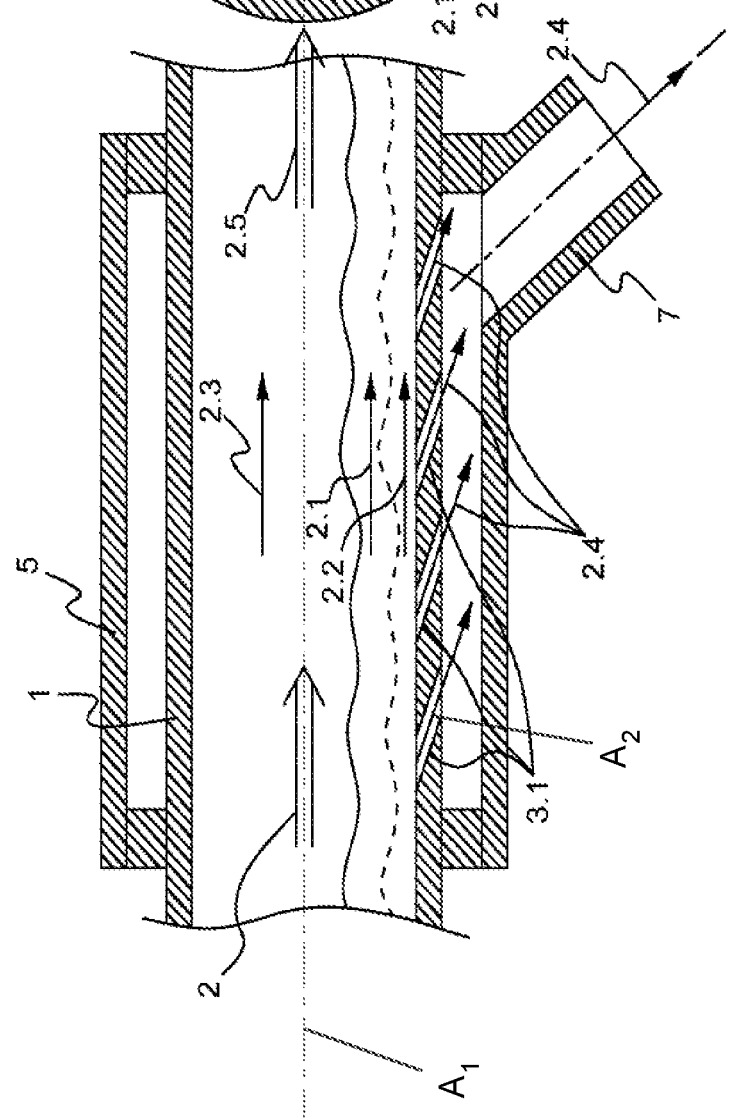
FIG. 7E
FIG. 7D

METHOD AND DEVICE FOR SEPARATION OF LIQUIDS AND GAS WITH USE OF INCLINED AND ROUNDED HOLES OR CHANNELS IN THE WALL OF A PIPE

BACKGROUND OF THE INVENTION

1. Technical Field

The present invention relates generally to the field of separation of water, oil and gas from a mixture of water, oil and gas flowing in a straight pipe or straight channel.

2. Description of the Background Art

To be able to remove water from a mixture of water and one or more other fluids, for example oil and gas, is of great significance in various technical processes. These processes relate to different types of dean chemical industries where clean phases are required, as well as to offshore fields where it is desirous to remove the water content in the produced oil and gas—a problem that increases during the lifetime of the field and limits the field's economical lifetime.

Separation by use of dynamical processes, i.e. based on centrifugal force, easily creates large shear stresses and problems by producing emulsions. Separation by use of gravitation only presupposes the velocity in the pipe/separator to be low enough for the flowing mixture to flow in separate layers (i.e. stratified flow), which puts limitations on velocity, and may cause significant volumes/dimensions.

Examples of references in the field include the following. Norwegian Patent No. NO 321386 to Norsk Hydro/Statoil, filing date: May 28, 1997, discloses separation preferably of e well fluid from a horizontal producer. Stratified water/oil, not gas, is employed. Level measurement with multilevel gamma radiation or water in oil and oil in reinjected water. No methodology is investigated for inlet or stratified flow. Residence time for densely packed layers in liquid which gives separator length: only data from normal large diameter separator tests. The outlet was not tested and tilting of separator is not mentioned in the patent. The main conclusion is that necessary technical details are not included in the patent at the filing date (May 28, 1997) or by patent granted date (Feb. 5, 2006).

US Patent Application US 2002 059866 A1, filing date Sep. 13, 2000 refers to patent NO 321386 to Norsk Hydro/Statoil. The specification discloses separation and possible reinjection of gas and water from a producer which tilts negatively 1-10 degrees. One step (gas and water are separated by gravitation) or two steps (gas in first step and oil/water in the next step) are employed.

Features include stratified water/oil and gas; removal of droplets in gas with swirl separator before compression and reinjection in reservoir; (droplet erosion, deposit of asphaltenes and the like); level measurements in gas/liquid- and oil/water separators.

Technical status: No methodology investigated for either inlet or stratified flow. Effect of gas with regards to tear-off of droplets from the gas/liquid interface was investigated at low and high pressures, but with small liquid volumes. Residence time for densely packed layers in liquid which gives the separator length: refers to patent 321386 to Norsk Hydro/Statoil. Outlet: refers to patent 321386 to Norsk Hydro/Statoil. Tilting of separator: air/water atmospheric tests for gas/water.

Main conclusion is that the necessary technical details were not included in the patent application by the date of filing (Sep. 13, 2000) nor when filed patent application was published (Sep. 13, 2001).

Norwegian Patent NO 20001954 to Kvaerner Oilfield Products As, filing date Apr. 13, 2000. Discloses methods and devices with separators. The patent relates to outlets from separator for gas/oil and water.

Technical status: Gas not included as fluid in the basic investigations for the patent. Calculations (CFD) give basis for detailed geometry as described in the patent. The outlet geometry was as such described in the patent without tests. Later in year 2000 tests with this geometry were performed. The results were not satisfactory.

SUMMARY OF INVENTION

The present invention is directed to both a method for ensuring optimal conditions for separation, and a separator device for extraction of water, oil and gas from a mixture of water-oil-gas flowing in a straight pipe or straight channel. A separation system consists of an inlet pipe followed by a transition to the separator.

The separator consists of a certain length of pipe with diameter larger than or equal to the inlet pipe and several inclined and profiled holes along the separator pipe wall. Water and oil/gas are separated such that dispersed flow (2-3 m/s) in the inlet is reduced to velocity equal or less than separated flow (0.7-1 m/s) at the outlet of the separator.

The method is based on the following phenomena. The velocity of the layered flow pattern is obtained at the outlet of the separator. Activation of surfactants in oil, which may create stable emulsions, is avoided. Significant flow of droplets in the gas is also avoided. Transition between inlet pipe and separator must have such a small angle that new droplets are not induced. Dense bed of droplets must coalesce before the outlet of the separator. Finally, gas/liquid slug flow must not occur.

The foregoing phenomena have been studied mainly with high-pressure tests. Allowed values for fluid parameters and geometry have been found. The limiting values have been included as part of the method.

The Device for Separation of Water from a Water-Oil-Gas Mixture

The device utilizes the separating ability of inclined and optimally rounded and profiled holes in a pipe wall discovered and proven by the inventors for separating water and oil being extracted through the inclined holes from a water-oil mixture flowing in the pipe.

The device consists of a horizontal pipe with one or more inclined holes, or groups of holes, located in axial lines in the pipe wall at the bottom of the pipe for extraction of water, and one or more groups of inclined holes in the pipe wall at the top of the pipe for extraction of oil and possible gas. Diameter of inclined hole: 3-10 mm, inclination angle: 10-15 degrees, radius of curvature of wall at the inlet to hole: 2-5× hole diameter.

Testing of the device has been performed by using a 20 mm ID pipe where an oil-water mixture was flowing. For separation of water, 10 inclined holes were provided in the pipe wall lying on an axial line at the bottom of the pipe. Hole diameter 3 mm, inclination angle 15 degrees and axial distances between holes 100 mm. For oil separation, the same pipe section was used by turning it 180 degrees around so that extraction of oil could be performed at the top of the pipe.

Limits for the separation ability of the inclined holes have been found. The separation capability for the individual holes in a group (an axial line) and located relatively close to each other is the same as when the single holes are acting alone; i.e. no negative effect of neighbourly has been observed. This is the case both for water separation, when the holes are located in a line at the bottom of the pipe, and for oil separation with the line of inclined holes located at the top of the pipe.

Limits for water cut WC for a certain velocity U.mix yielding good separation with the inclined holes have been found. For water continuous flow the separation efficiency for water=>1. Oil continuous flow yields separation efficiency for oil=>1. The efficiency is independent on the extraction velocity.

Maximum water separation (1.0) is obtained when WC is lying above a certain lower limit which is dependent on U.mix; and maximum oil separation (1.0) is obtained when WC is below an upper limit. Between them, water separation and oil separation=>1 is simultaneously achieved. For U.mix=1.0 m/s both water separation and oil separation=>1, when 0.32<WC<0.68 and for U.mix=1.5 m/s when 0.42<WC<0.58. For U.mix=2.0 m/s the limits are: 0.48<WC<0.54.

The range within a WC-U.mix diagram providing both maximal water separation maximal and oil separation, has the shape of a triangle. If the starting point for the separation is lying outside the triangle, the separation process is divided into two periods. In the first period, the dominant phase is extracted until the internal of the triangle is reached, or until the flow has become stratified. From that point on water and oil are sucked off in parallel until the velocity becomes 0. In that way the variation of the water cut and the mixture velocity along the pipe axis, can be calculated.

Application of the Invention

In many technical processes, it is of utmost importance to remove water from a liquid mixture, for example form a water-oil mixture. This can be operated with two liquids. Provided that the water is the heaviest of the phases, the water can be removed using the profiled inclined holes when they are provided in the bottom, even when the phases are well mixed.

The advantage of this separator compared to a pure gravitation separator is that the separation ability of inclined and optimally rounded holes, even for well mixed phases, makes separation possible for significantly higher velocities than stratified flow (2-3 times larger). This leads to reduced dimensions of pipes and other equipment.

Use of the separator downhole or subsea means that produced water in the well can be removed by re-injection to the reservoir by a deviated well. This removal of water can be performed on an early stage of the process, which leads to extended operation of an oil- or oil-gas well before shutdown.

To be able to remove water from a mixture of water and one or more other fluids, for example oil and gas, is of great significance in various technical processes.

The present method and equipment for separation, use of the specific separation capability of the inclined holes, can be applied even when the mixture velocity is significantly high. Even at a velocity of 2-3 times the velocity at stratified flow, the separation principle according to the invention has shown to give very close to clean water and clean oil from the mixture. Separation under considerable flow velocities (2-3 m/s) will result in that the dimensions of the separator is reduced. The separator is expected to be applicable for removing water on an early stage of the process, and thereby contribute to extending the profitable operation of an oil- or oil-gas well.

BRIEF DESCRIPTION OF THE DRAWINGS

The foregoing and other features and advantages of the present invention will become apparent from the following detailed description of the invention, taken in conjunction with the accompanying drawings, which are briefly described as follows.

FIGS. 6A and 6B are sectional side and front views, respectively, of a separator pipe configured in accordance with the present invention to include an angled hole for separation of water from a mixture of water, oil and possibly gas in the pipe; while FIG. 6C is a partial view showing the details of the separator hole in greater detail.

FIGS. 7A-7E illustrate different views of two embodiments of the separator of the present invention wherein FIGS. 7A, 7B and 7C are sectional side, front and bottom views, respectively, of a separator configured in accordance with a first embodiment of the present invention to include a separator pipe equipped with a collection of inclined holes at the bottom of the pipe for extraction of water and a corresponding collection of inclined holes or channels along the top of the pipe for extraction of oil and possibly gas; while FIGS. 7D and 7E are sectional side and front views, respectively, of a separator configured in accordance with a second embodiment of the present invention to include a separator pipe equipped only with a collection of inclined holes at the bottom of the pipe for extraction of water from a mixture of water, oil and possibly gas.

DETAILED DESCRIPTION OF INVENTION

Figure 1:
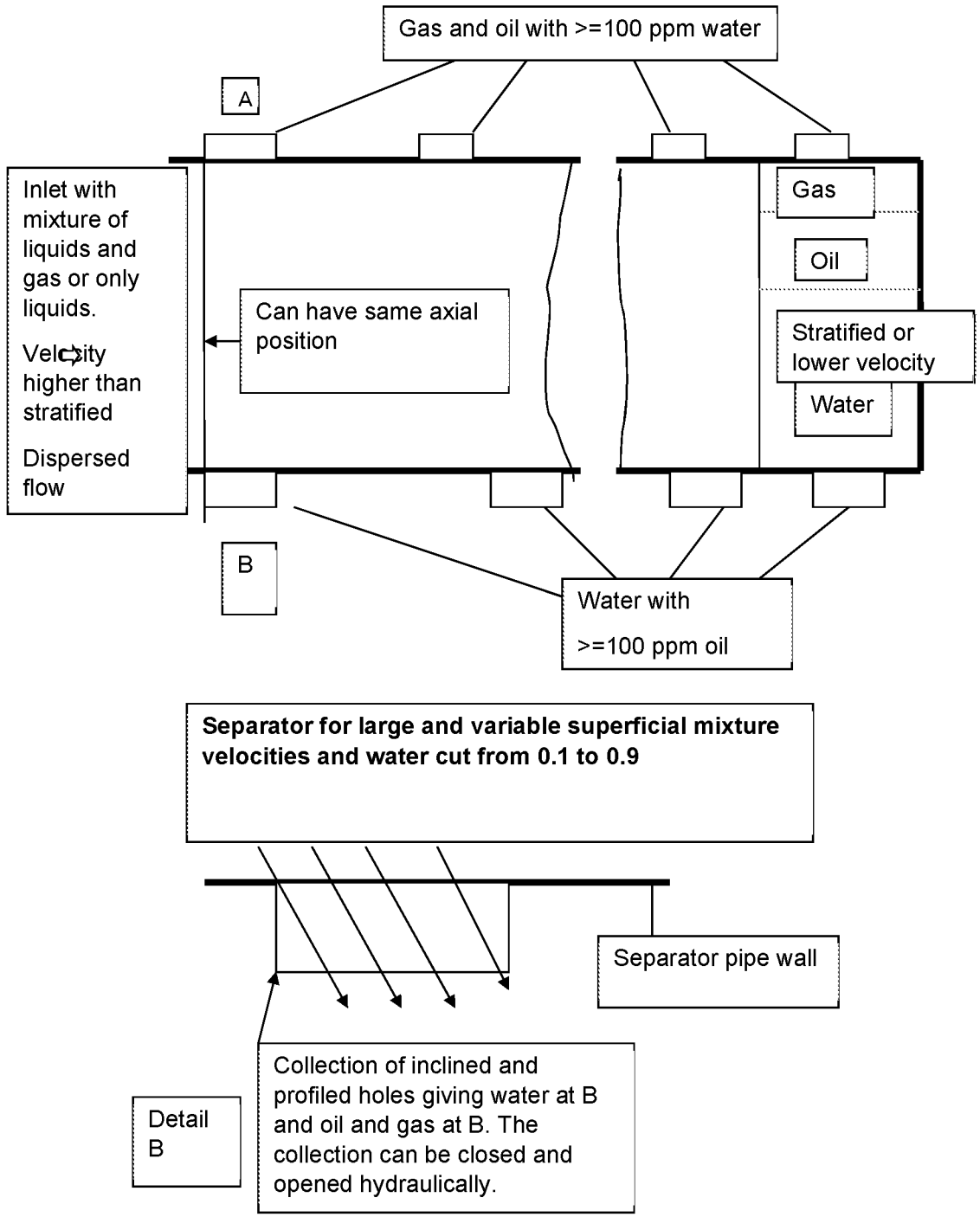
FIG. 1 is a schematic block diagram of a separator system constructed in accordance with the present invention.

The present invention relates a separation system for separation of water, oil and gas from a flowing mixture of these phases. With reference to FIG. 1, the separator system consists of an inlet pipe followed by a transition to the separator. This one consists of a certain length of pipe with diameter larger or equal to the inlet pipe and having collections of inclined and profiled holes (smoothly rounded) in the pipe wall along the separator's axis at the bottom of the pipe and at the top of the pipe.

Water and oil/gas is sucked off through these inclined holes so that the mixture flow velocity in the pipe reduces from dispersed flow (velocity 2-3 m/s) at the inlet of the separator—to a velocity less than or equal to the velocity for stratified flow (0.7-1.0 m/s) at the outlet/end of the separator.

The present invention includes a first embodiment directed to a process for providing suitable flow in the separator pipe and a device (i.e. the geometry and the location of the inclined holes) for removing water, oil and gas along the separator.

1) Process to Provide Adequate Flow Regime for Use of the Device

A) Avoid Activation of Surfactants in the Oil which Will Prevent Coalescence.

Tests (de Boer plot) demonstrate that density of oil and pressure at reservoir conditions determine if the important surfactant asphalts are activated. Without active surfactants, the separation of water from oil by continuous flow is rapid (30-60 seconds). The tested oils are so-called "live oils" that never have been pressure reduced, i.e. having the pressure reduced to lower than reservoir pressure. The oils have been collected in pressure bottles from the reservoirs. The separation time with pressure released oils (atmospheric pressure) increased from 30 seconds to 120 minutes. The reason is that surfactants in the oil prevent coalescence of the water droplets.

B) Significant Volume of Droplets in the Gas Must be Avoided.

Figure 2:
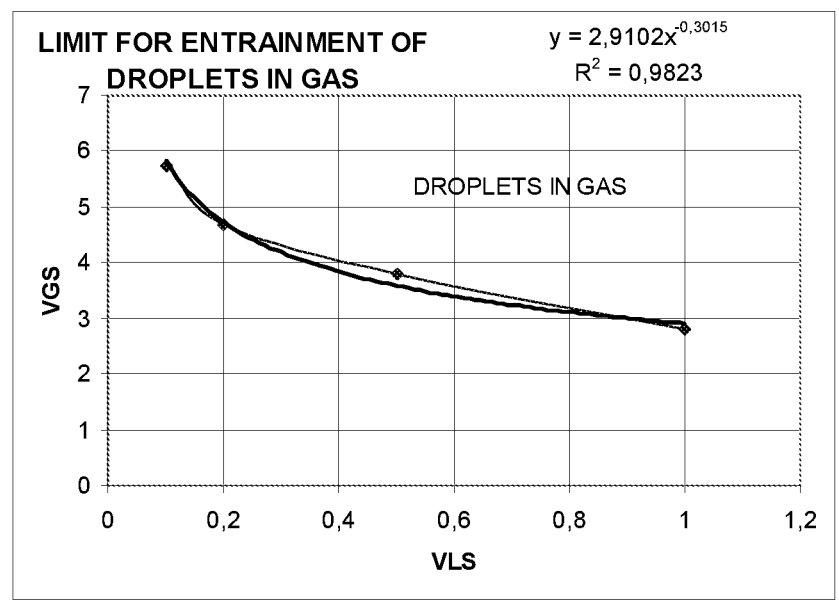
FIG. 2 is a graph depicting superficial liquid velocity (VLS) as a function of superficial gas velocity (VGS) (m/s) for the limit for entrainment of droplets of liquid in gas.

Tests demonstrate that droplets in the gas are avoided, see the graph of FIG. 2.

C) New Droplets Must not be Generated by Change in Diameter/Geometry of the Separator To avoid generation of new drops in the connection (conical tube/diffusor) the outlet angle between the inlet pipe and the separator must be less than 10-20 degrees.

D) Removal of Dense Bed Droplets

With water, continuous flow oil droplets may concentrate below the oil phase and produce a densely-packed layer. This layer will not coalesce against the oil until after a certain residence time.

The required residence time has been recorded in full scale tests for condensate. The length of the separator has to be increased to satisfy the required residence time for a dense packed layer of droplets. A too short separator will fill the entire system with droplets and separation will not be satisfactory.

The residence time is given by the following expression:

$$t = K * Cp * (ID/0.254) \text{ (seconds)}$$

where:
K: Coefficient specific for each oil with active surfactants. If the surfactants are not active the value of K is approximately equal for all oils (73 seconds)
Cp: Viscosity of the oil phase (kg/(m2*s)
ID: Internal diameter of the separator (m)

The results shown in Table 1 for the oils investigated confirm that the expression above gives a satisfactory estimate for a new oil downhole when the diameter is equal for the separators.

2) Conditions for Stratified Flow
A) Gas/Oil/Water Flow

We get the following limit value for superficial liquid velocity VLS-critical which gives a limit against stratified flow:

$$VLS = 1.5 * \left(1 - \frac{VGS}{2}\right)$$

Where:
VGS=QG/A=superficial gas velocity (m/s)
QG: volumetric flow rate of gas (m3/s)
A:=cross sectional area of separator (m2)
VLS-critical=QL/A=critical superficial liquid velocity (m/s)
QL=volumetric flow rate of liquid (m3/s)

Figure 3:
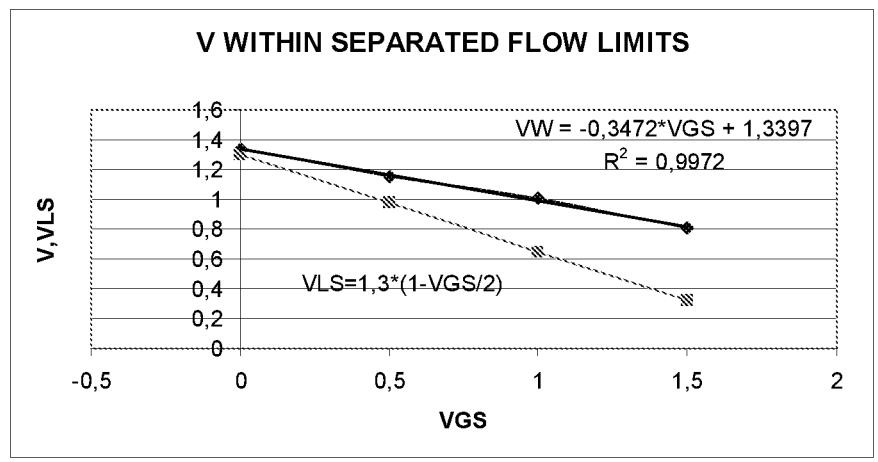
FIG. 3 is a graph depicting the water phase velocity VW (with dense droplet layer) for light oil/water/gas at the limit value for superficial liquid velocity VLS-critical. VW varies mainly with VGS and not much with the water cut.

For light oil/water/gas with the above limiting value, the water phase velocity VW (with dense droplet layer) will be as shown in FIG. 3.

VW varies mainly with VGS and not much with the water cut.

B) Oil/Water Flow

For oil/water flow it has been observed that the critical superficial liquid velocity VLS (m/s) is mainly a function of ID of the tube when the physical parameters for water and oil and water cut has been decided.

Figure 4:
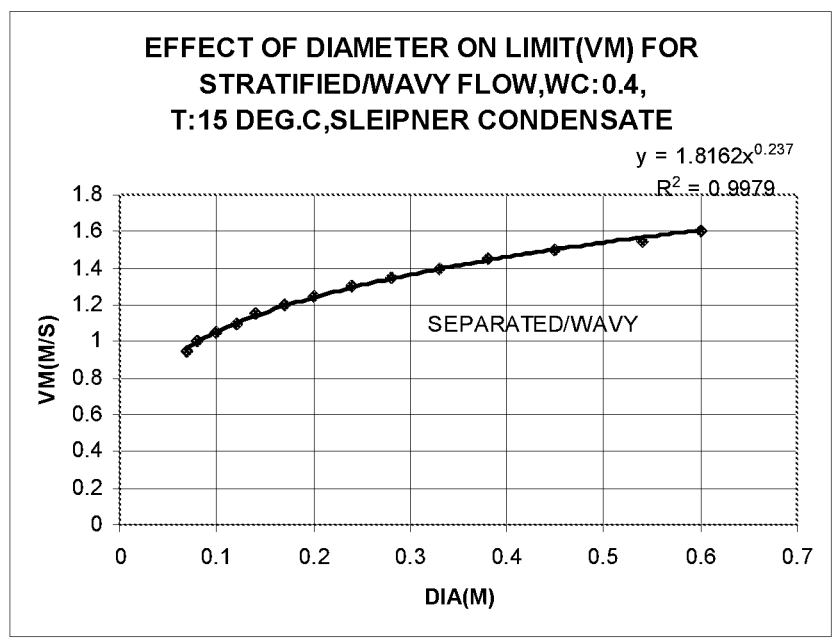
FIG. 4 is a graph depicting critical superficial liquid velocity VLS (m/s) as a function of ID of the separator pipe or tube.

This parameter shows when a separated flow is going over to a dispersed flow as a function of diameter in FIG. 4.

From the data in FIG. 4 we obtain a critical value as follows:

$V_L{}^S=1,8162*ID^{0.237}$ (m/s)

C) Gas/Liquid Slug Flow Must not Occur

Tests demonstrate that slug flow in the inlet will continue in the separator and prevent stratified flow.

Figure 5:
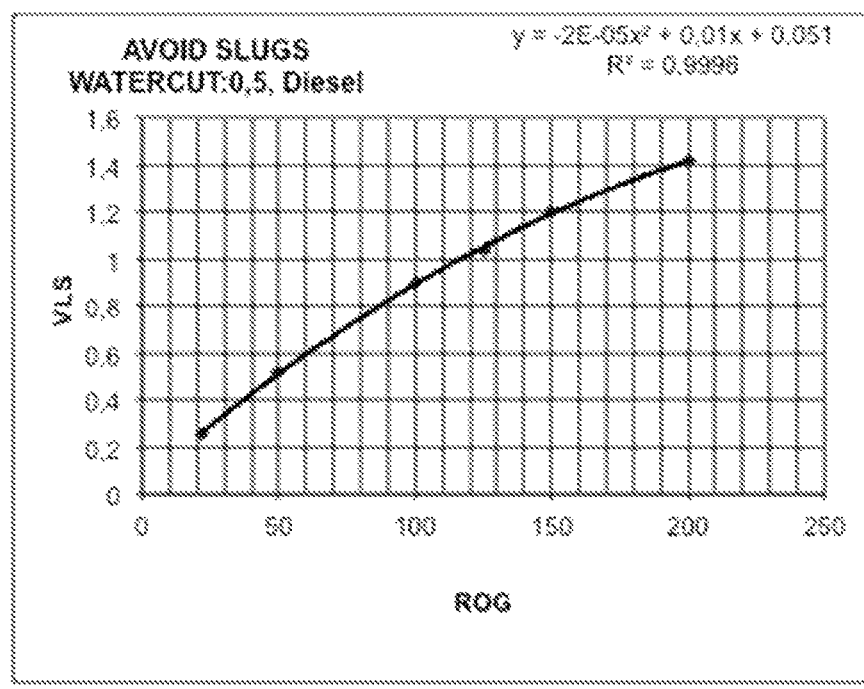
FIG. 5 is a graph depicting the critical superficial liquid velocity VLS (m/s) necessary to avoid slug formation which is mainly a function of gas density ($\rho$ kg/m3) and of viscosity (Cp) of the continuous liquid phase.

The critical superficial liquid velocity VLS (m/s) to avoid slug formation is mainly a function of gas density (ρ kg/m3)—see FIG. 5—and of viscosity (Cp) of the continuous liquid phase:

VLS-critical=$1.12*Cp^{-0.16}*(-2E05*\rho_2+0.01*\rho+0.051)$ (m/s)

Superficial liquid flow equals:

$$VLS = \frac{QL}{A}$$

QL: Volumetric liquid flow (m3/s)
A: Inner cross sectional area of inlet tube (m2)

3) Examples of Downhole Separation and Extraction with Stratified Flow
A) Three-Phase Flow, Crude Oil 1, Viscosity 0.72 Cp, Pressure 180 Bars The example has different ID for inlet and separator. Resulting possible production rate to experience stratified gas and liquid in the separator is shown in Table 2.

B) Three-Phase Flow, Crude Oil 2, Viscosity 1.75 Cp, Pressure 180 Bars

The example has equal ID for inlet and separator. The results are given in Table 3. Depending on ID and gas volume, the produced volume of liquid is sufficient for the most oil-rich fields.

C) Oil/Water Flow, Equal Diameter Inlet and Separator, Crude Oil 1, Viscosity 0.72 Cp, Pressure 180 Bars Critical superficial liquid velocity VLS (m/s) is substantially a function of tube diameter when physical parameters for water and oil and water cut are decided. For Crude oil 1 the flow with ID 8-12" will be stratified in the inlet and the separator. Substantial rates can be obtained—see Table 4.

4) Separation Device
A) the Separation Ability of Inclined Holes.

The device utilizes a phenomenon discovered by the inventors and experimentally proven that liquid being extracted from a flowing mixture of water and oil through inclined holes in the pipe wall undergoes a separation that takes place in the inlet to the inclined holes itself. The holes have a significant separating ability being due to their inclination and the specific profile/rounding of the pipe wall area in front of the entrance to the hole—an effect that is lacking for holes being normal to the pipe wall.

The inclination, typically 15 degrees to the pipe wall, in addition to the pipe wall being rounded and optimally profiled at front of the hole entrance—yields for extraction from a highly mixed flow of oil and water (velocity 2-3 times higher than by stratified flow) pure water when the holes are located at the bottom of the pipe and pure oil when the holes are located at the top of the pipe—supposed the combination of water cut and mixture velocity is lying within limits that have been found experimentally.

By applying the specific ability of the inclined holes for separation, the separation process can start, and proceed, at significant higher velocity in the pipe (2-3 m/s) than the velocity for stratified flow (0.7-1.0 m/s). That means separation can proceed at reduced dimensions of pipe and equipment.

B) The Inclined Rounded Channel—the Central Unit of the Separator.

FIGS. 6A and 6B show details concerning the inclined channel 3 in the pipe wall. The inclined channel 3 is lying in same plane as the pipe axis 1 so that hole axis $A_2$ and pipe axis $A_1$ intersect. Internally in the pipe the channel 3 is directed towards the flow direction. The angle between the pipe wall and channel axis $A_2$ is 5-15 degrees. The channel diameter to be applied increases for increasing pipe diameter and is between 3-20 mm for pipe diameter 20-250 mm. The wall area 4 in the transition between the internal pipe wall 1 and the internal wall of inclined channel 3 is rounded and curved so that instead of the corner C the wall has a smooth and edge less entrance to the inclined hole.

C) The Specific Embodiments of the Device

FIGS. 7A-7E and FIGS. 8A and 86 show 3 different embodiments of the present invention. Each of the embodiments is made up of a horizontal or near horizontal straight pipe 1 where a mixture 2 of water 2.1 and oil 2.2 and possibly gas 2.3 is flowing where water and oil are well mixed—and where the velocity may be significantly higher (2-3 m/s) than for stratified flow (0.7-1 m/s). The pipe 1 is equipped with a collection of inclined channels 3.1 at bottom of the pipe for extraction of water and a corresponding collection of inclined channels 3.2 along the top of the pipe for extraction of oil and possibly gas (FIGS. 7A-7C). In FIGS. 7D and 7E, the pipe is provided with inclined channels 3.1 only at the bottom of the pipe to extract water alone.

The pipe is surrounded by a collection jacket 5 for collection of the extracted water (FIGS. 7D and 7E) and water, oil/gas (FIGS. 7A-7C). In FIGS. 7A-7B the collection jacket is made of a cylindrical pipe which is coaxial to the separator pipe 1 creating an annulus shaped space between this outer pipe 5 and the internal pipe 1.

This annulus is equipped with a horizontally partition wall 5.3 which coincides with the main pipe axis 1 and divides the annulus in a lower chamber 5.1 for collection of water being extracted through the lower inclined channels 3.1 and an upper chamber 5.2 for collection of oil, and possibly gas, being extracted through the inclined channels 3.2 at the upper pipe wall.

Figures 8A, 8B:
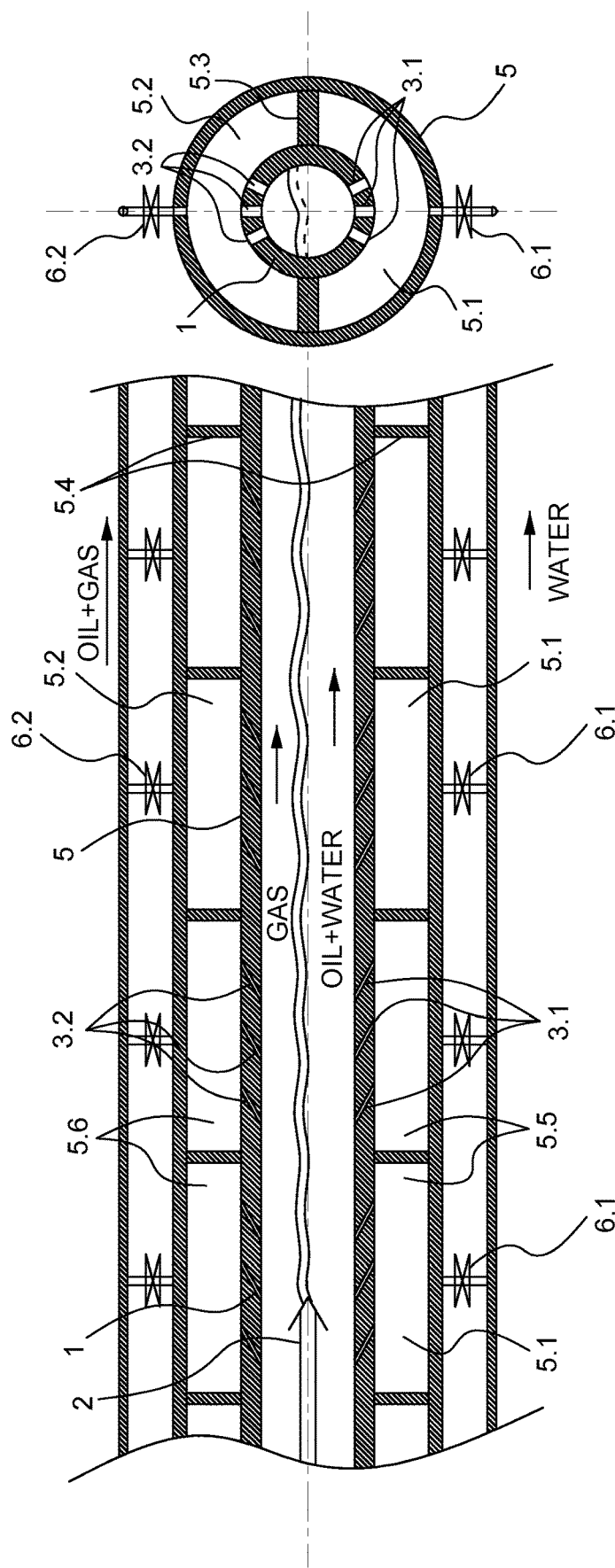
FIGS. 8A and 8B are sectional side and front views, respectively, of a separator configured in accordance with a third embodiment of the present invention to include a separator pipe equipped with a collection of inclined holes at the bottom of the pipe for extraction of water and a corresponding collection of inclined holes or channels along the top of the pipe for extraction of oil and possibly gas. Upper and lower chambers are divided in sub-chambers at the bottom and at the top of the separator pipe. Each sub-chamber at the bottom of the pipe and at the top of the pipe enclose their individual groups of inclined holes at the two locations to allow control of the chambers with regulation valves.

Upper and lower chambers 5.1 and 5.2 may in addition be divided into sub-chambers 5.5 at the bottom and 5.6 at the top which are made up by vertically mounted partition walls 5.4 as shown in FIG. 8A. Each sub-chamber at the bottom of the pipe and at the top of the pipe enclose their individual groups of inclined holes at the two locations.

By use of regulation valves at the outlets from the various sub-chambers, the corresponding group of inclined holes may be switched on or switched off.

D) Verification of the Separator Principle

1) The Test Section Applied for Verification

Figure 9:
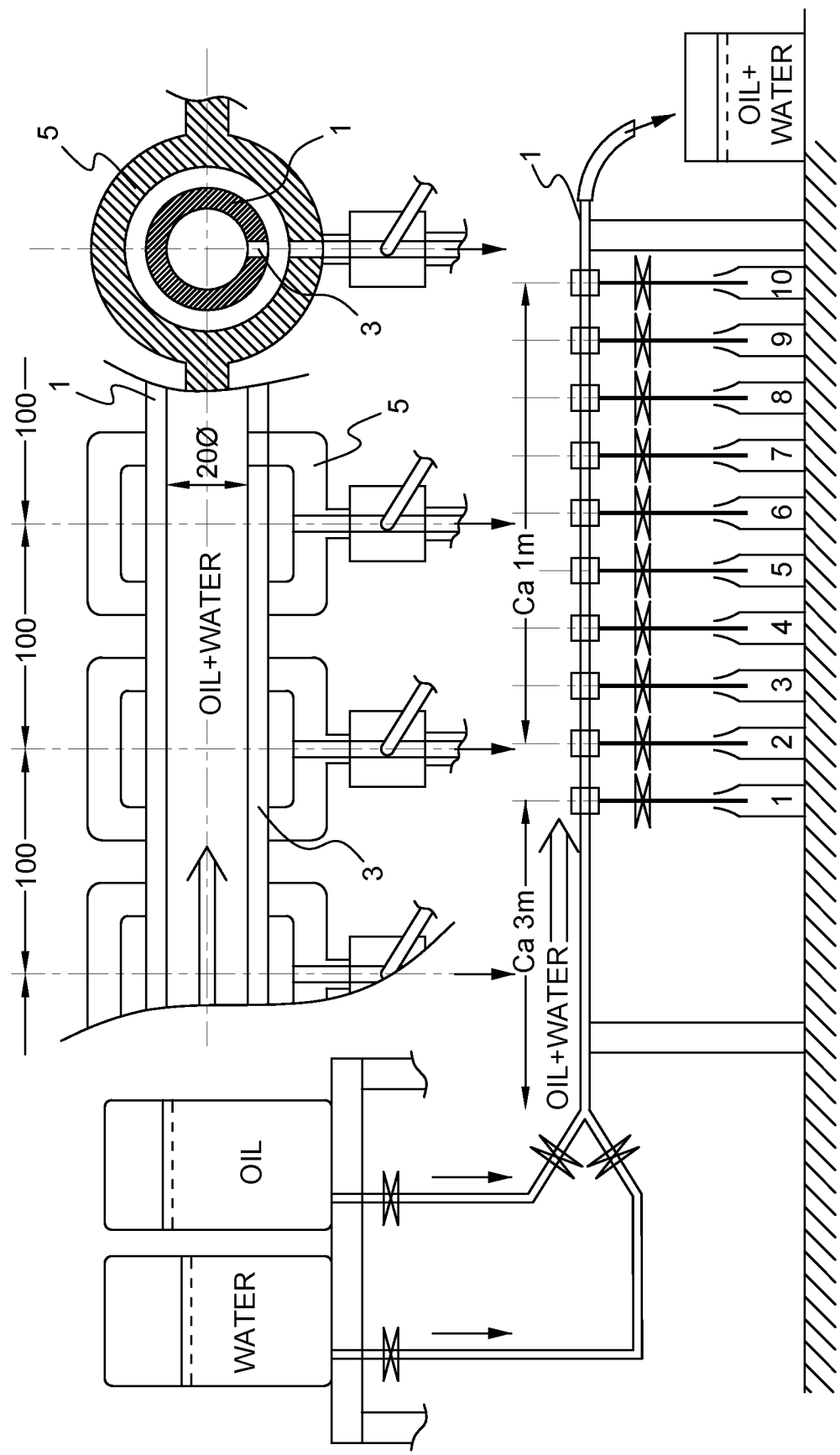
FIG. 9 is a diagrammatic illustration of a test apparatus that was constructed for verifying operation of the separator embodiments of the present invention.

The separation principle, both the separation capability of the individual inclined holes and the separation capability for a group of inclined holes, has been verified by applying a test section as shown in FIG. 9.

The test section consisted of a 20 mm. ID horizontal pipe 1 with 10 inclined holes located on an axial line at the bottom of the pipe. Hole diameter was 3 mm, hole inclination angle 15 degrees, internal distance between holes 100 mm and the holes were covering 1 meter of the pipe length. Through the test section a mixture of water and Shellsol D70 was flowing.

By regulating a valve connected to each inclined hole, extraction from each individual hole was performed, such that the extraction velocity Uh from each hole could be varied from hole to hole. Both extraction velocity Uh and the separation quality WC.sep of the separated liquid were measured for each hole and experiments were run for different velocities U.mix and water cuts WC.pipe in the pipe.

2) Water Separation Through Inclined Holes at Bottom of Pipe:

For the inclined holes at the bottom of the pipe both water cut WC.sep for the separated liquid and the extraction velocity Uh from each hole was measured for a variety of velocities U.mix and water cuts, WC.pipe in the pipe.

3) Oil Separation Through Inclined Holes at the Top of the Pipe:

By turning the pipe 180 degrees around, so that the inclined holes were located at the top of the pipe, the oil cut OC.sep of the extracted liquid and the corresponding extraction velocity Uh were measured for each inclined hole for a large set of velocities U.mix and inlet water cuts, WC.pipe, in the separator pipe. Extraction through inclined holes yields pure phases when water cut and mixture velocities are lying within limits that have been found.

Figure 10:
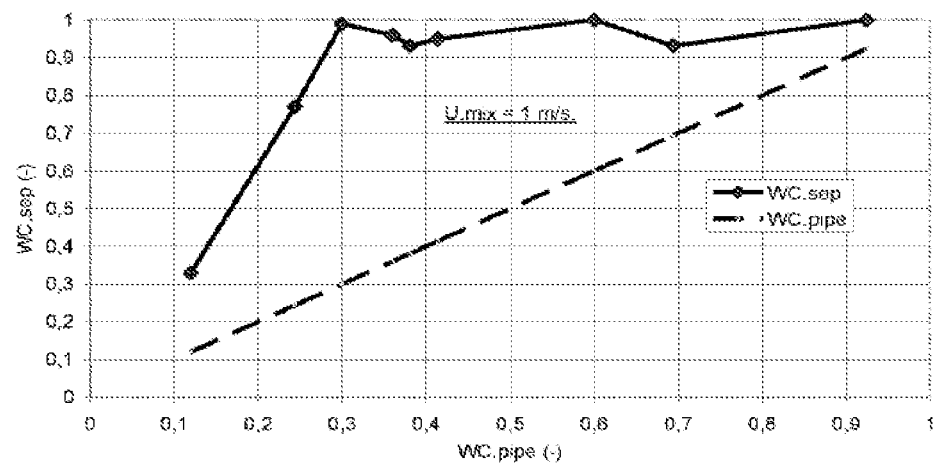
FIG. 10 is a graph depicting the separation quality WC.sep for water extraction at the bottom of the separator pipe for U.mix=1.0 m/s. The figure shows that for WC.pipe>0.30 pure water or near to pure water is obtained—i.e. WC.sep=>1. I.e. water extraction through inclined holes yields separation quality=>1 for water continuous flow.

The separation quality WC.sep for water extraction at the bottom of the pipe is shown in FIG. 10 for U.mix=1.0 m/s. The figure shows that for WC.pipe>0.30 pure water or near to pure water is obtained—i.e. WC.sep=>1. I.e. water extraction through inclined holes yields separation quality=>1 for water continuous flow.

Figure 11:
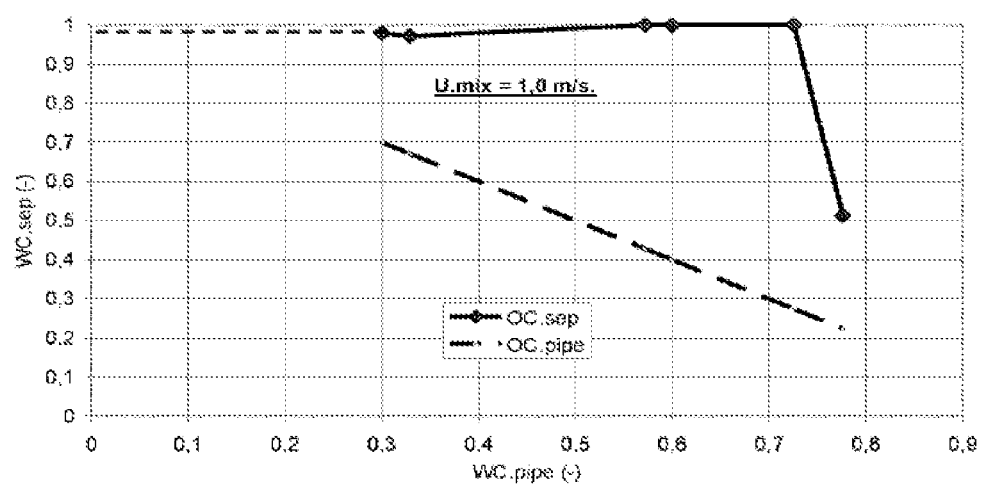
FIG. 11 is a graph depicting the separation quality or oil extraction at the top of the pipe for U.mix=1.0 m/s. The figure shows that for WC.pipe<0.73, pure oil or nearly pure oil, is separated through the inclined holes, i.e. OC.sep=>1.

The separation quality or oil extraction at top of pipe is shown in FIG. 11 for U.mix=1.0 m/s. The figure shows that for WC.pipe<0.73 pure oil or nearly pure oil, is separated through the inclined holes—i.e. OC.sep=>1. That means: oil extraction through inclined holes at top of pipe yields oil separation quality=>1 for oil continuous flow.

Figure 12:
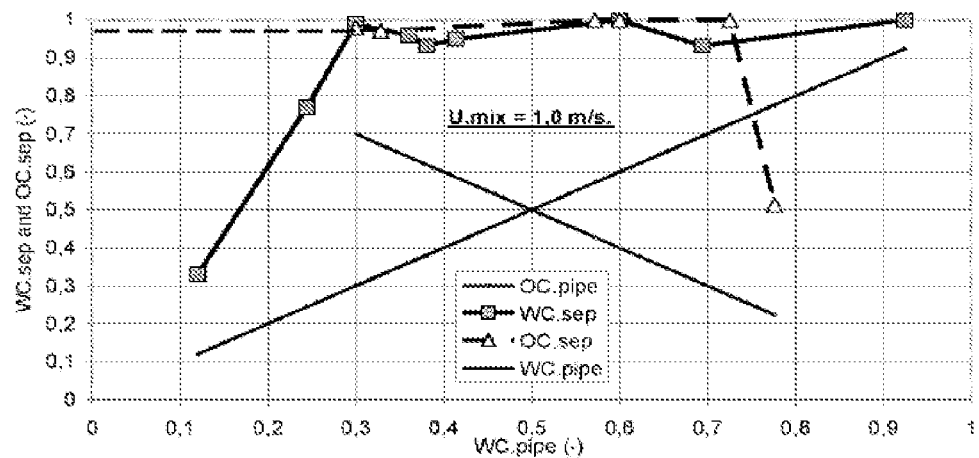
FIG. 12 is a graph showing the two plots from FIGS. 10 and 11 in the same diagram. This shows that for U.mix=1.0 m/s, both water separation through inclined holes at the bottom of the pipe and oil separation by extraction through the inclined holes at the top of the pipe yield separation quality=>1 when 0.30<WC.pipe<0.73.

In FIG. 12 the two plots are shown in the same diagram, showing that for U.mix=1.0 m/s both water separation through inclined holes at the bottom of the pipe and oil separation by extraction through inclined holes at the top of the pipe yield separation quality=>1 when:

$$0.30 < WC.pipe < 0.73$$

Figure 13:
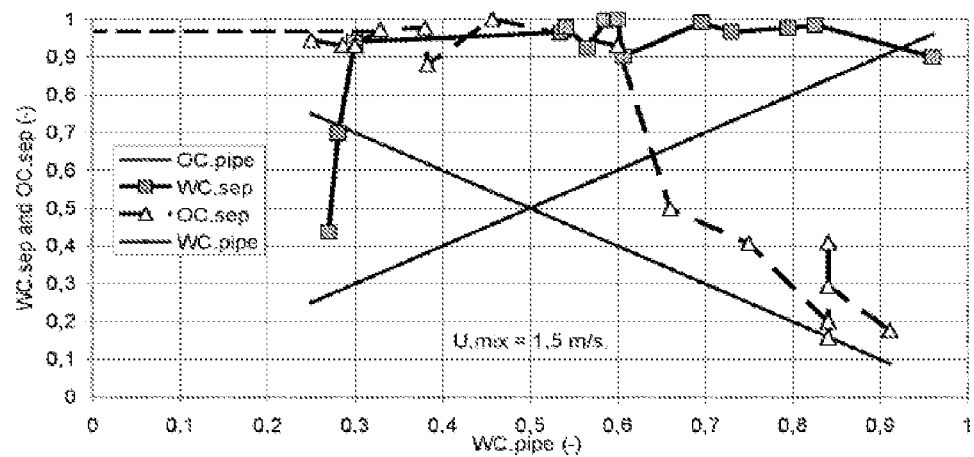
FIG. 13 is a graph showing similar plots to those in FIG. 12 for water separation and oil separation for U.mix=1.5 m/s. Here WC.sep and OC.sep=>1 are obtained when 0.30<WC.pipe<0.60.

In FIG. 13 similar plots for water separation and oil separation are shown in a similar diagram for U.mix=1.5 m/s. Here WC.sep and OC.sep=>1 are obtained when:

$$0.30 < WC.pipe < 0.60$$

The range of WC yielding both WC.sep=>1 and OC.sep=>1 is shown for 4 values of U.mix in Table 5.

Figure 14:
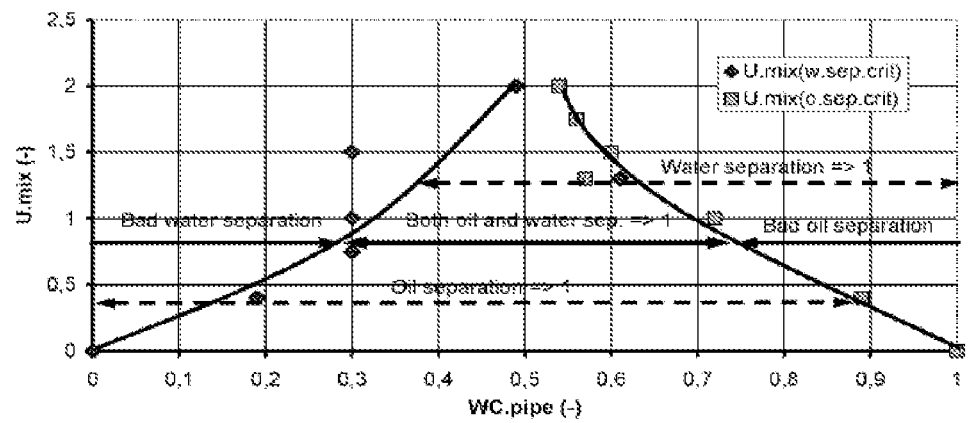
FIG. 14 is a graph depicting the range of water cut WC in the pipe for which separated water cut WC.sep and separated oil cut OC.sep of quality=>1 are plotted for the various U.mix values. A triangle like area appears where the width of the triangle indicates the interval of water cut WC.pipe for which simultaneous water separation at the bottom of pipe and oil separation at the top yield quality=>1.

In FIG. 14 the range of water cut WC in the pipe for which separated water cut WC.sep and separated oil cut OC.sep of quality=>1 are plotted for the various U.mix—values. A triangle like area appears where the width of the triangle indicates the interval of water cut WC.pipe for which simultaneous water separation at bottom of pipe and oil separation at top yield quality=>1.

3) Extraction Velocity Uh of No Importance to the Separation Quality

Figure 15:
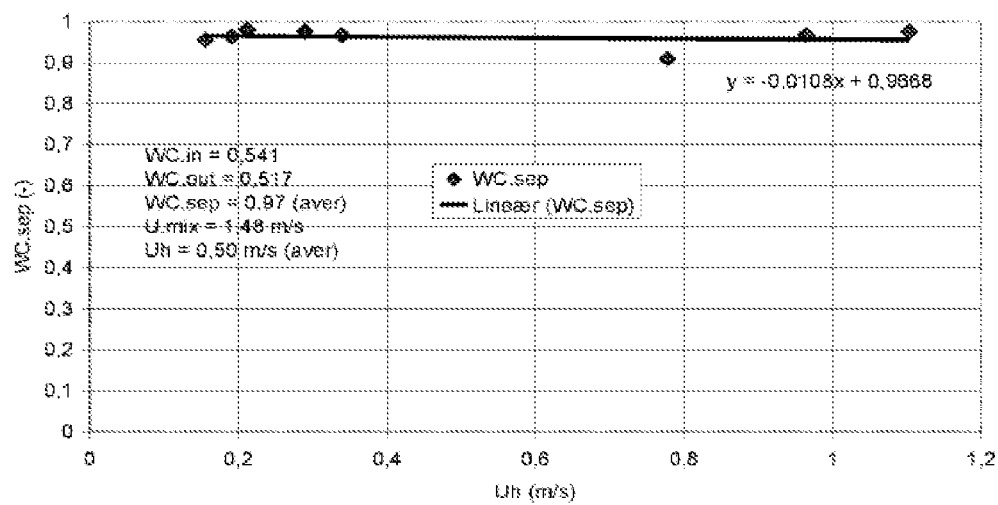
FIG. 15 is a graph depicting the separation quality, WC.sep, for water extracted at bottom of pipe versus extraction velocity, Uh. This figure shows that the separation quality is the same and independent of the extraction velocity.

In FIG. 15 the separation quality, WC.sep, for water extracted at the bottom of the pipe has been plotted versus extraction velocity, Uh. This figure shows that the separation quality is the same and independent on the extraction velocity.

Figure 16:
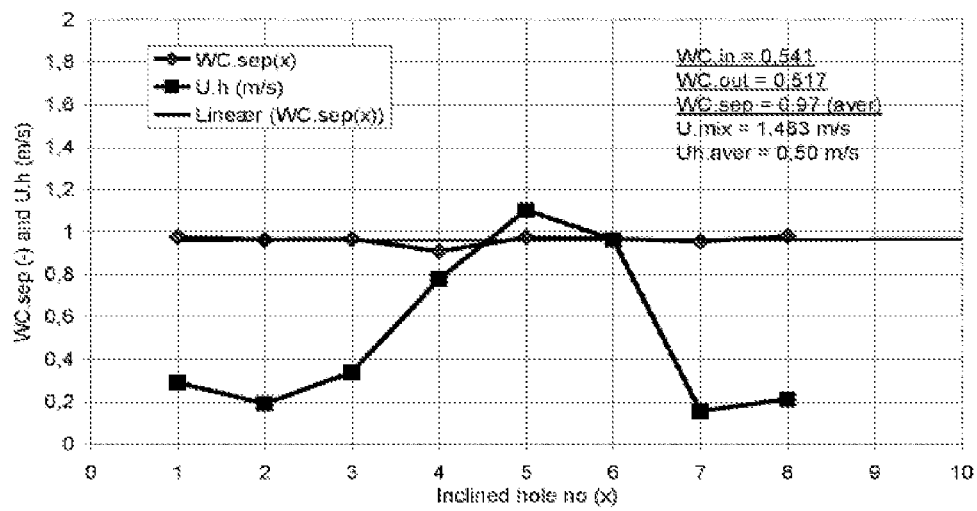
FIG. 16 is a graph in which the separation quality for extraction of water at the bottom of pipe has been plotted along the hole row for 9 inclined holes. Here the extraction velocity Uh is varying significantly. This figure shows that still the same separation quality is obtained, i.e. WC.sep=>1; i.e. it shows that WC.sep is independent of Uh.

In FIG. 16 the separation quality for extraction of water at the bottom of the pipe has been plotted along the hole row for 9 inclined holes. Here the extraction velocity Uh is varying significantly. This figure shows that still the same separation quality is obtained, i.e. WC.sep=>1. I.e. it shows that WC.sep is independent of Uh. The location of the inclined hole along a line of no importance to the separation quality.

Figure 17:
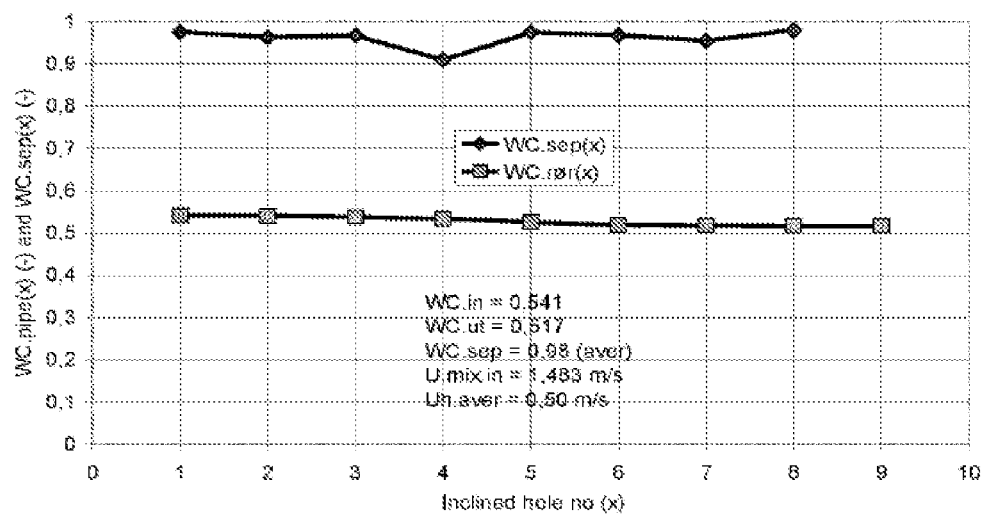
FIGS. 17 and 18 are graphs in which WC.sep and OC.sep have been plotted for the various holes, respectively. The plots show that the same separation quality (WC.sep=>1 and OC.sep=>1) is obtained independent of the location of the holes. No negative influence on the separation ability from the neighboring holes is observed.
Figure 18:
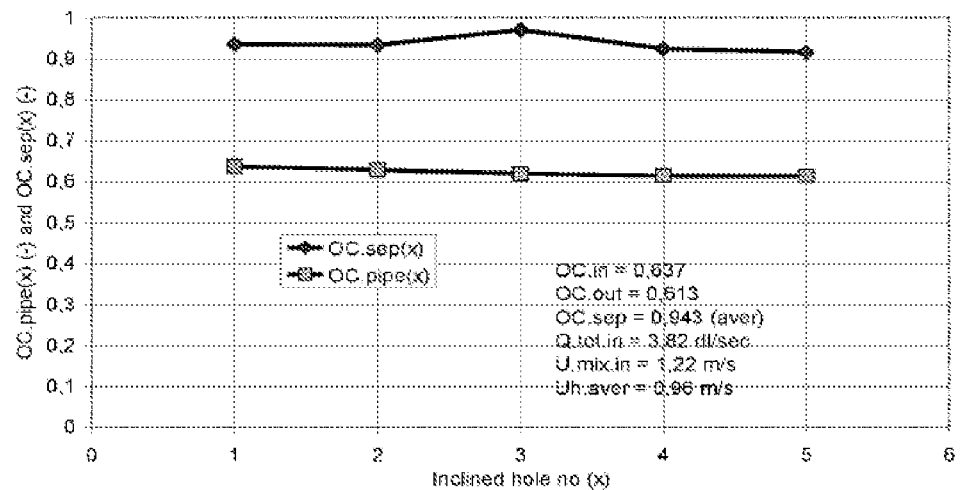

In FIG. 17 and FIG. 18, WC.sep and OC.sep have been plotted for the various holes, respectively. The plots show that the same separation quality (WC.sep=>1 and OC.sep=>1) is obtained independent on the location of the holes. No negative influence on the separation ability from the neighboring holes is observed.

4) The Influence from the Performance of the Inclined Hole

Figure 19:
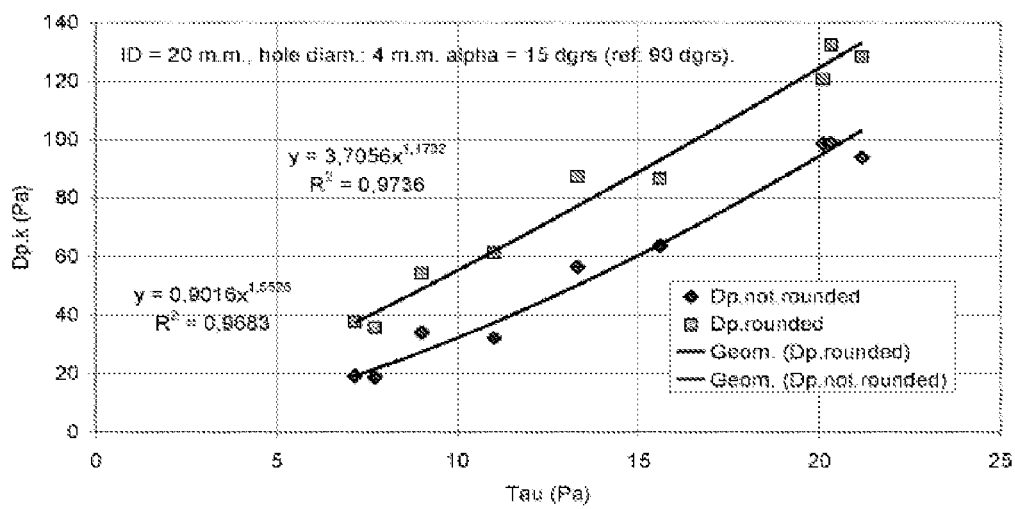
FIG. 19 is a graph depicting the effect of rounding the transition area 4 at the edge C in FIG. 6 between the internal pipe wall 1 and the internal wall 3 of the inclined hole. Here two inclined holes have been compared—the one is rounded (radius of curvature 5 mm), the other without.

The effect of rounding the transition area 4 at the edge C in FIG. 6A between the internal pipe wall 1 and the internal wall 3 of the inclined hole is shown in FIG. 19. Here two inclined holes have been compared, the one is rounded (radius of curvature 5 mm), the other without. For corresponding shear stresses, the pressure increase is seen to become 30-100% higher by rounding the inlet edge C. Increased pressure means increased fluid flow into the inclined hole. The plot shows that fluid mixture is more easily guided into the entrance of the inclined hole when the inlet is rounded so that the capacity in that way increases. The optimal rounding will have a radius of curvature 2-5 times the diameter of the inclined hole.

Separator Capacity when Applying a Set of Inclined Holes

Figure 20:
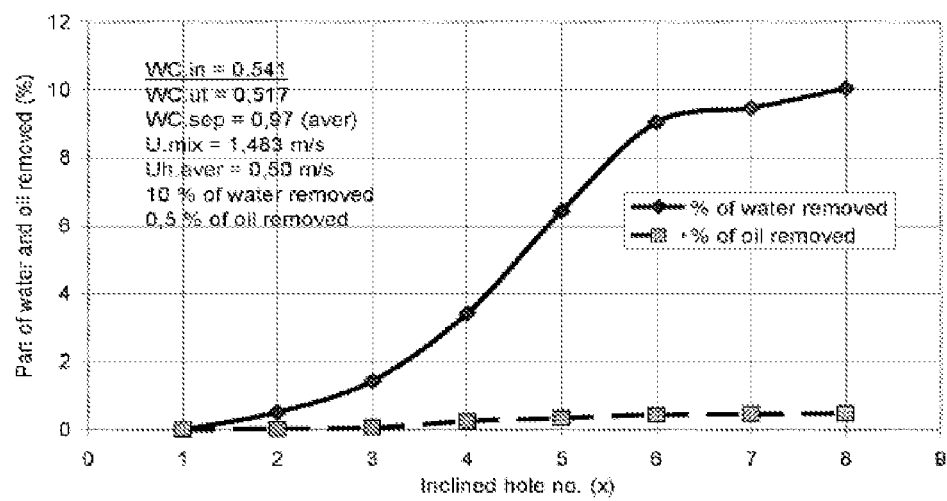
FIG. 20 is a graph showing after 9 inclined holes 10% of the water in the mixture has been separated, while only 0.5% of the oil has been removed.
Figure 21:
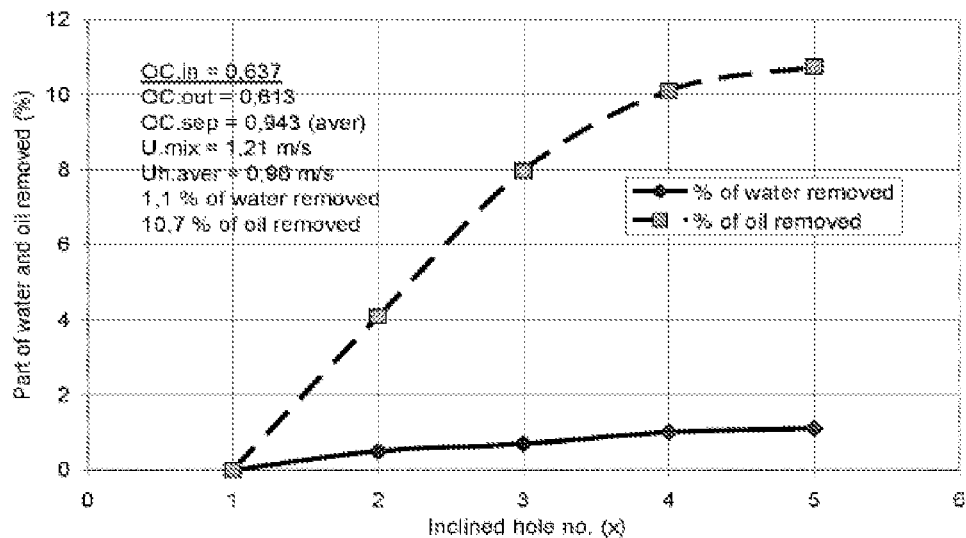
FIG. 21 shows the similar result for oil separation: After 5 inclined holes at the top of the pipe 10.6% of the oil has been sucked off, while 1.2% of the water has been removed together with the oil. This indicates a similar section with around 100 inclined holes at the top of pipe and at the bottom to be capable for removing all the water and all the oil.

In FIG. 20 it is shown that after 9 inclined holes, 10% of the water in the mixture has been separated, while only 0.5% of the oil has been removed. FIG. 21 shows the similar result for oil separation: After 5 inclined holes at the top of the pipe, 10.6% of the oil has been sucked off, while 1.2% of the water has been removed together with the oil. This indicates a similar section with around 100 inclined holes at the top of the pipe and at the bottom of the pipe to be capable of removing all of the water and all of the oil.

5) Subdivision of the Holes in Groups Along Pipe Axis

To obtain separation quality=>1 for both oil and water it is necessary to regulate the extraction process along the pipe axis in a way that separation proceeds within the triangle in FIG. 14. This is obtained by dividing the whole line of inclined holes in FIG. 9 in groups where each group is managed individually. This is performed by dividing the collection chamber, both the lower one 5.1 and the upper one 5.2, into sub chambers by use of vertical partition walls 5.4 as shown in FIG. 8A.

Each sub chamber then includes and covers a selected group of inclined holes. Extraction from the various hole groups then are controlled hydraulically in a way that the actual hole group either is joined in or switched off. The total development of the separation along pipe axis then can be regulated so that the separation proceeds internally in the triangle in FIG. 14, thus yielding separation quality for both water and oil=>1.

6) Separation Performance in General.

Separation cases may occur where the process starts with e.g. a high water cut and significant mixture velocity U.mix (for example>1.5 m/s). The starting point is then lying outside the triangle in FIG. 14 on its right hand side. At this place WC.sep=>1 while OC.sep is low. The procedure then becomes as follows. The separation process starts by extracting water only until the process enters the internal side of the triangle, where both phases yields separation quality=>1. This is done by letting one or more of the first hole groups in FIGS. 8A-8C for oil extraction be closed until the internal side of the triangle is reached (to point B). From this point on both water extraction and oil extraction will have separation quality=>1 and all inclined hole groups for both oil and water from this point on are kept open and are at working until the velocity in pipe becomes =0. A corresponding procedure is applied when the starting with a high oil cut.

The first group of holes for water extraction then are kept closed, until the internal of the triangle is reached (to point B). From that point on oil and water are extracted simultaneously until U.mix=0.

7) Prediction of the Separation Development for a Selected Separator Case.

Selected geometry of separator: Separator pipe: ID=20 mm. The separator pipe is equipped with inclined holes at the top of the pipe and at the bottom of the pipe, in accordance to FIGS. 8A-C. The collection chamber 5 is divided into a lower main chamber 5.1 and an upper main chamber 5.2 by use of horizontal division walls 5.3.

Both of these are again divided by vertical partition walls 5.4 in 8 sub chambers at the upper part of the pipe and 8 sub chambers at the lower part of the pipe, all of them being of 0.5 m length. Total length of the separator then becomes 4 meters.

Each sub chamber at the top is covering 12 inclined holes at the top of pipe and every sub chamber at the bottom is covering 12 inclined holes at the bottom of pipe. From each of these sub chambers liquid is extracted through a valve which is either open or closed.

8) Case No 1: U.mix=1.5 m/s, WC.in=0.20

Figure 22:
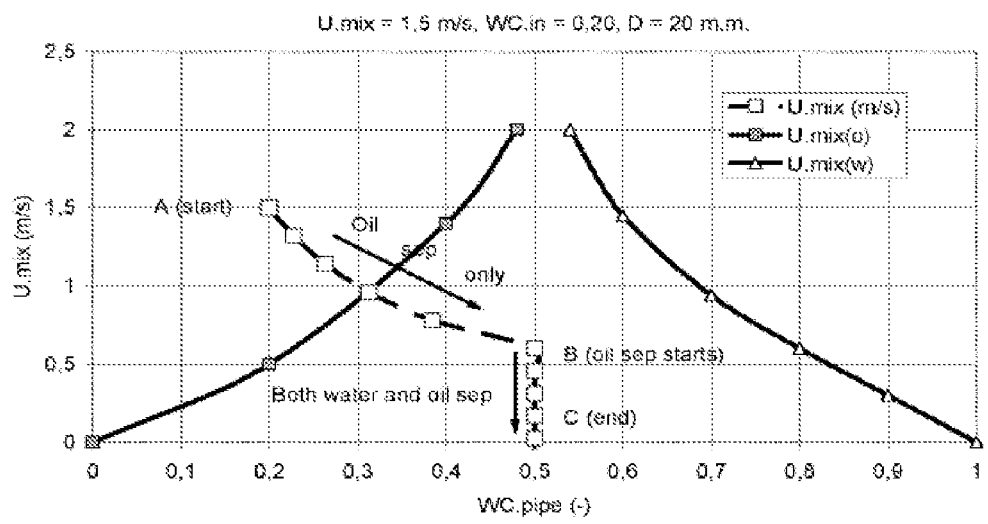
FIG. 22 is a graph showing U.mix as a function of WC.in in a Case 1 study where U.mix=1.5 m/s and, WC.in=0.20.

The starting point A in FIG. 22 is lying outside the triangle. Here, OC.sep=>1, while WC.sep becomes less successful. Therefore, the separation process is divided in two periods as illustrated in FIG. 23.

Period 1: From A to B: Only oil separation is performed. The 6 groups of holes at the bottom of the pipe are closed. Only the first 6 groups of holes for oil extraction at the top of the pipe are functioning. The water cut then increases while the velocity in the pipe U.mix decreases. Point B in the middle of the triangle then is reached. Here WC has increased to =0.50 and U.mix has decreased to 0.60 m/s. (If sand is present the minimum value of U.mix will be that corresponding to stratified flow: 0.72 m/s).

Period 2: From B to C: Here both oil and water are extracted in parallel until U.mix=0 Totally 8 inclined hole groups for extraction of oil and 4 hole groups for extraction of water are required.

Figure 23:
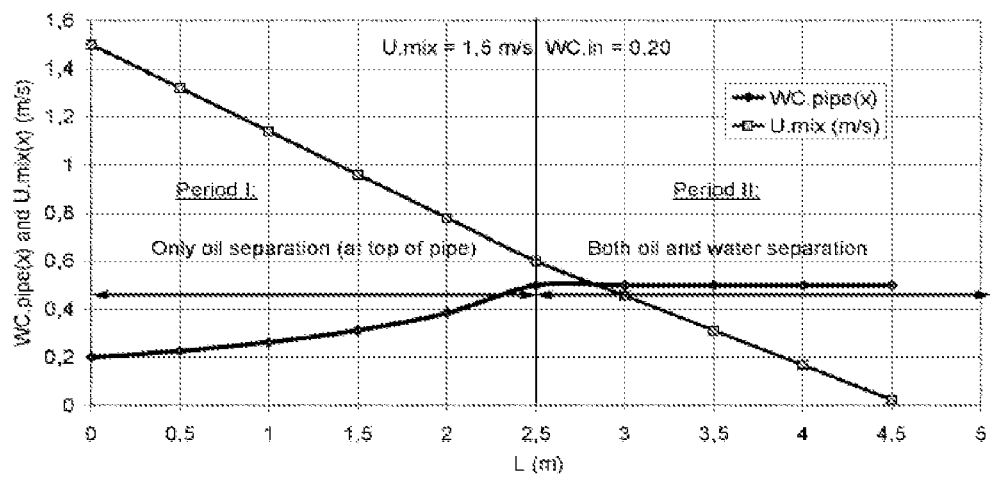
FIG. 23 is a graph showing two separation periods that occur in the Case 1 study; a first period during which only oil is separated and a second period during which both oil and water are separated.
Figure 24:
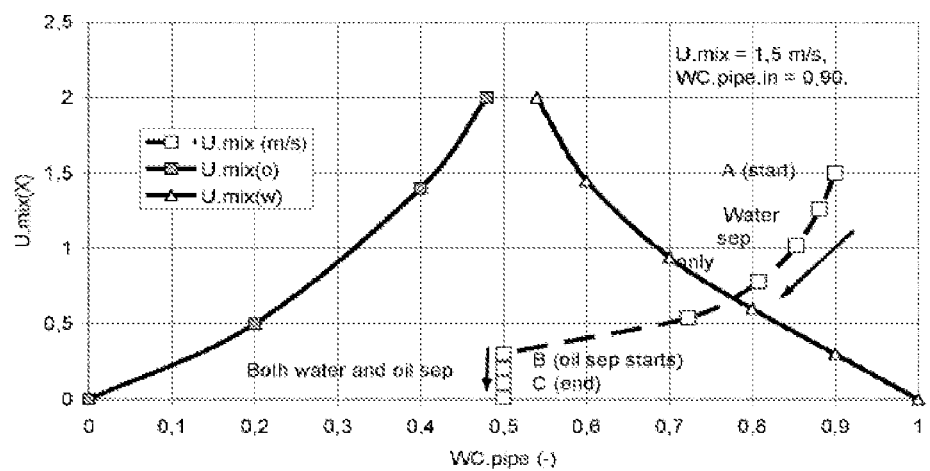
FIGS. 24 and 25 are graphs that correspond to FIGS. 22 and 23, respectively, for a Case 2 study in which U.mix=1.5 m/s and WC.in=0.90. In this case, only water is separated in a first period while both oil and water are separated in a second period.

The separations performance along the pipe axis is shown in FIG. 23 where U.mix(x) and WC(x) have been plotted. The total separator length becomes 4 meters: That means 8×12=96 inclined holes at top are at work for oil extraction and 4×12=48 inclined holes are at bottom for water extraction.

9) Case No 2: U.mix=1.5 m/s, WC.in=0.90

Figure 25:
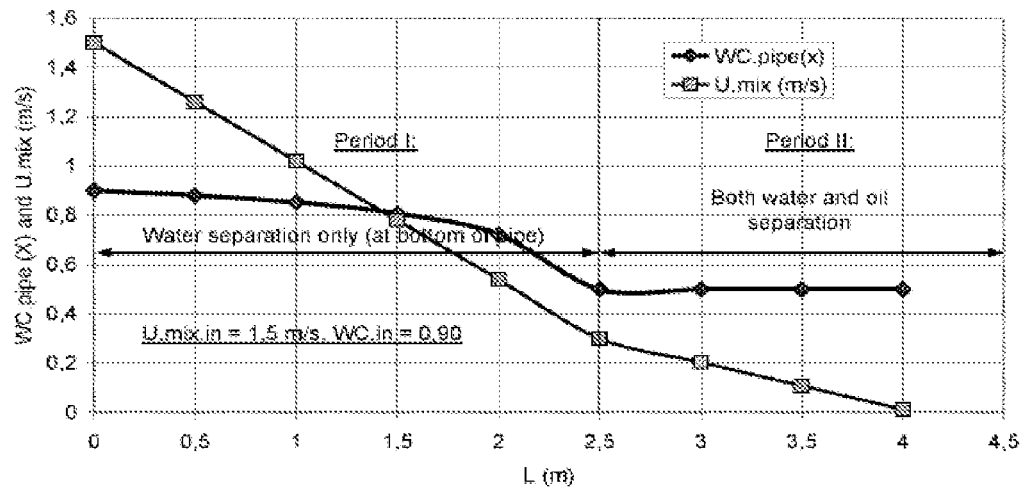

The starting point A in FIG. 25 is lying outside the triangle on its right-hand side. Here, WC.sep=>1 is obtained while OC.sep is less good. Here too the separation is carried out in two steps.

a) Period 1: from a to B:

Only water separation extends well—i.e. only water has to be extracted until the triangle is entered. The water cut then decreases together with the mixture velocity U.mix. In the first 4 hole groups, only water is extracted (the corresponding 4 hole groups for oil are closed). The point B in the diagram then is reached. Here WC has been reduced to = 0.50 and U.mix has been reduced to 0.30 m/s.

b) Period 2: from B to C:

Here oil and water are separated in parallel until U.mix=0 m/s (If sand is present, U.mix minimum should be equal to stratified flow: 0.72 m/s).

Totally 9 groups of inclined holes are applied for removal of water and 4 hole groups for removal of oil.

The proceeding of the separation along the pipe axis has been shown in FIG. 25 where U.mix(x) and WC(x) have been plotted.

Here too the total separator length becomes 4 meter: That means 48 inclined holes at top of pipe and 108 inclined holes at bottom.

10) Case No 3: U.mix=1.5 m/s, WC.in=0.50

Figure 26:
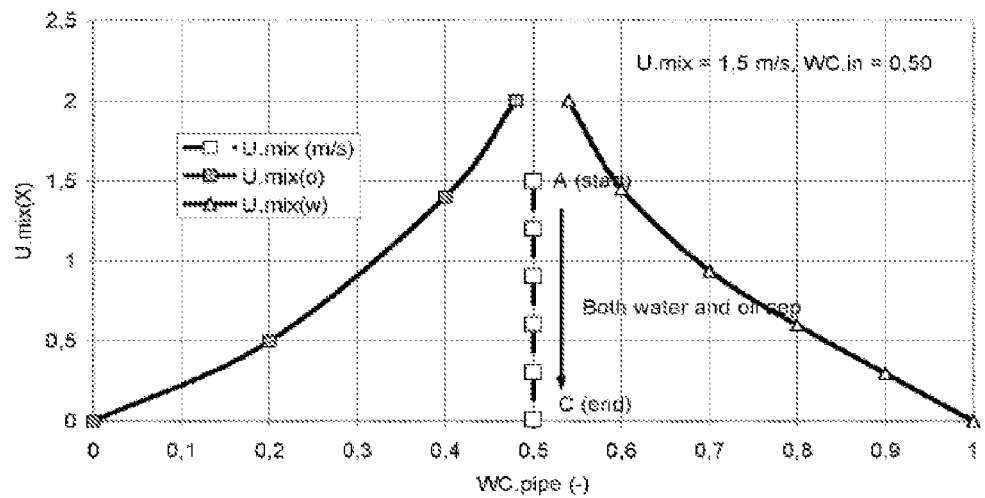
FIGS. 26 and 27 are graphs that correspond to FIGS. 22 and 23, respectively, for a Case 3 study in which U.mix=1.5 m/s and WC.in=0.50. In this case, only one period occurs in which both water and oil are separated from the flow stream.
Figure 27:
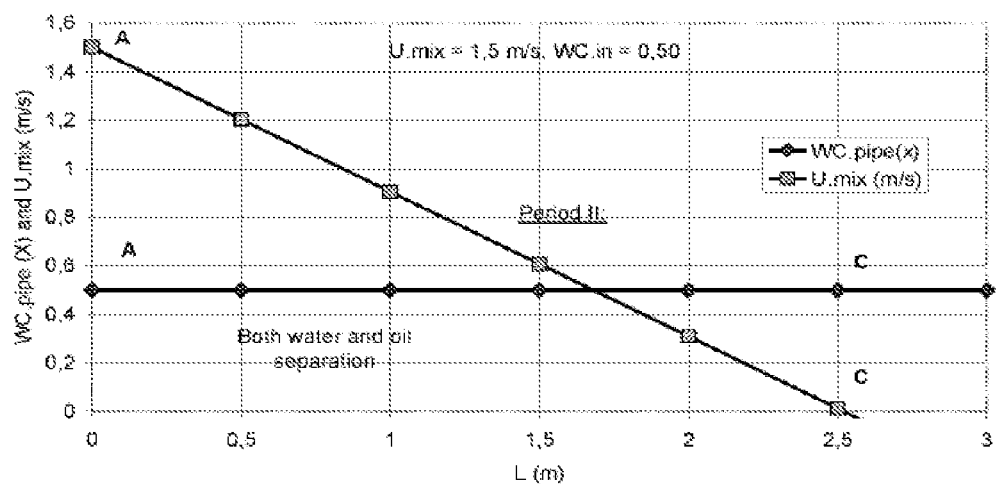

Here the starting point A is lying internally in the triangle in FIG. 26 where both WC.sep=>1 and OC.sep=>1. The separation then proceeds simultaneously and in parallel for the two phases. We then move vertically downwards in the center of the diagram until U.mix=0. FIG. 27 shows the development of U.mix(x) and WC(x) along the pipe axis. Totally 6 hole groups are required and the separator length becomes 2.5 meters (If sand is present U.mix minimum has to be the velocity of stratified flow: 0.72 m/s).

11) Alternative Routes within the Triangle

Point B, where simultaneous extraction of the two phases starts, may not lie exactly at the center of the triangle (i.e. at WC=0.50)—which has been chosen in the selected calculation examples. It is sufficient to extract the dominating phase until the triangle is entered—and from that point on both phases can be separated simultaneously until the velocity has become 0.

For several separation cases it is possible to reach the velocity for stratified flow (0.72 m/s for a 20 mm. ID pipe) immediately when the internally of the triangle is reached.

When the flow has become stratified both phases are clean—such that water removal and oil removal then can proceed parallel simply and fast.

12) Regulation to Keep Water in Oil and Oil in Water on Acceptable Levels

In order to keep water in oil and oil in water below acceptable levels samples of the separated liquids are taken. The water content in the oil coming from the seabed or platform is measured (by down-hole application). Measurement of the oil in water to be re-injected is performed by letting water from the separator be conducted with driving liquid returning from the pump to a dry place (for example an unmanned platform) where the concentration of oil is measured. The quantity of re-injected water is regulated by the pump so that the separation of water satisfies the required purity of the produced oil and the re-injected water. This regulation system has been tested and is applied for hydraulic managed down hole pumps for re-injection of water.

The level of water is regulated so that it corresponds to the required purity of oil and water.

13) Multi Stage Separation

Purity as high as possible (25 ppm) for both oil and water outlet from separator can be obtained by letting the separation process described above be repeated in two or more subsequent stages for the water and the oil outlet from Stage 1.

'Stage 1' then consists of the separator pipe as described in FIG. 8 with groups of inclined holes at top and at bottom. For two-stage separation a 'Stage 2-water' follows for further cleaning of water coming out from the bottom at 'Stage 1'—and parallel to it a 'Stage 2-oil' for further cleaning of the oil being extracted from the top of Stage 1.

The 'Stage 2-water' cleaning proceeds in a pipe similar to FIG. 21, however—inclined holes only at top. The water extraction from Step 1 through the inclined holes in its bottom is then led into this "Step 2—water" pipe. Through these inclined holes at top, the remnant oil is sucked off. This remnant oil will contain some amount of water—and therefore it is re-circulated—i.e. it is lead back to the inlet of 'Stage 1'. The remaining water out from 'Stage 2-water' will be very clean as for oil content.

The oil is treated in a similar way. That oil, after being extracted from the top of 'Stage 1', is lead through a 'Stage 2-oil'—having inclined holes only at the bottom. From these holes water is extracted which may be somewhat polluted by oil. This water is re-circled—i.e. it is lead back to the inlet of 'Stage 1'.

For cases of very strict requirements as for purity two third stages—two 'Stage 3'-ones—being similar to these two 'Stage 2'-ones—are applied in a similar way.

14) Three Phase Gas-Oil-Water Flow

For three phase water-oil-gas flow the gas is separated from the liquid flow by extracting gas through the inclined holes at top of pipe, either alone or together with the oil. If the amount of gas is significant (e.g. UGS>2.5 m/s for a 250 mm pipe, 90 bar) gas only is extracted throughout the first inclined holes at top of pipe (same arrangement as in FIG. 8). Thereafter the oil and the water are separated according to the procedure for oil and water separation described above. I.e. the dominant liquid phase is extracted until the liquid mixture resides within the triangle in FIG. 13.

If the amount of gas is low or moderate (UGS<2.5 m/s for a 250 mm pipe, 90 bar) the oil and the gas are extracted simultaneously and thereafter the procedure becomes similar to that of oil and water flow alone.

Avoiding Steady Sand Bed in the Separator System

Sand filters enclosing the producer will ensure maximal sand particles to be approximately ⅓ of the opening in the sand filter. Maximum size of particles passing through standard filters will have a diameter of approximately 80 micrometers. In general the sand/particles are moving as a bed (or distributed in the liquid for larger diameter of the separator) when the velocity corresponds to stratified flow—i.e. the minimum velocity applied in the separator. Steady state sand bed is avoided by the velocity of stratified flow—which is the lower velocity for the separator—being higher than the velocity of a moving sand bed for different pipe diameters—as shown in Table 6.

The inclined holes at bottom of separator are located in a way that sand/particles for normal production passes through the inclined holes near bottom of separator and out in vertically part of annulus containing separated water.

15) Avoid Sand Erosion

The velocity of the fluids is sufficient low, 0.7-1.5 m/s, for sand erosion not to be significant. Removal of possible stationary sand particles is carried out by applying a flexible tube (e.g. applying the Schlumberger system).

16) Avoid Emulsion into the Separator

The separator can be applied for cleaning of an oil-water mixture for velocities 2-3 times that of stratified flow—supposed no emulsion is present.

5% Excel D70 oil was mixed in a water tank and the mixture was left for 2-3 days. After passing through a centrifugal pump and separator, a stabile emulsion was produced (lifetime: several days). In order to avoid emulsion in the experiments presented, a height difference for driving the mixture was applied.

Parameters and their Limit Values

A: Cross section area for separator pipe, 0.015-0.066 (m$^2$)

D: Pipe diameter (m) (typically 0.05 m-0.50 m)

d: Diameter of inclined hole (mm.) (typically 3-10 mm.)

L: Length of separator for a dense droplet layer to coalesce 0-200 (m)

Cp: Viscosity 0.2-20 (kg/m$^2$s)

$Q_l$: Production rate for liquids 800-5000 (m3/day)

$Q_w$: Production rate for water 80-4500 (m3/day)

$Q_o$: Production rate for oil 80-4500 (m3/day)

$Q_g$: Production rate for gas 0-1 (smm$^3$/day)

WC: Water cut: $Q_w/(Q_w+Q_o)$ 0.1-0.9

$WC_{in}$: Water cut of liquid mixture at inlet to separator $WC_{sep}$: Water cut of extracted/separated liquid OC: Oil cut: $Q_o/(Q_w+Q_o)$ $OC_{sep}$: Oil cut of extracted/separated liquid VLS: Superficial liquid velocity: $Q_l/A$ 0-1.3 (m/s)

VGS: Superficial gas velocity: $Q_g/A$ 0-2.5 (m/s)

U.mix: Mixture velocity for the mixture of phases (=VLS) 0-2.5 m/s

Tau Wall shear stress 1-30 (N/m$^2$),

V: Velocity of dense bed of droplets in axial direction, 0.1-2.5 (m/s)

$U_h$: Extraction velocity through inclined hole (m/s), 0.05-1 (m/s)

$\rho_g$: Gas density, 0-250 (kg/m$^3$)

$\rho_l$: Liquid density, 700-1000 (kg/m$^3$)

$\rho_o$: Oil density, 500-1000 (kg/m$^3$)

Tables

TABLE 1

| Oil: | Viscosity (cP) | Measured coalescence time (sec) | Coalescence time found from condensate (sec) |
|---|---|---|---|
| Oil 1 | 0.72 | 30 | 30 |
| Oil 2 | 10 | 650 | 620 |
| Oil 3 | 1.75 | 80 | 76 |
| Oil 4 | 0.87 | 10 | 41 |
| Oil 5 | 1 | 10 | 39 |
| Oil 6 | 0.73 | 30 | 33 |
| Oil 7 | 0.74 | 40 | 29 |

TABLE 2

| W. CUT | | PRESSURE (BAR | VISCOSITY (cP) | LENGTH (m) | D-PROD (inches) | D-SEPAR. (inches) | QL (m³/day) | QG (m³/day) |
|---|---|---|---|---|---|---|---|---|
| 0.4 | Oil wet | 180 | 0.72 | 68 | 8 | 10 | 3356 | 0.64 |
| 0.6 | Water wet | 180 | 0.37 | 33 | 8 | 10 | 2708 | 0.53 |
| 0.4 | Oil wet | 180 | 0.72 | 52 | 7 | 10 | 1825 | 0.78 |
| 0.6 | Water wet | 180 | 0.37 | 28 | 7 | 10 | 2029 | 0.7 |
| 0.4 | Oil wet | 180 | 0.72 | 42 | 6 | 10 | 1302 | 0.83 |
| 0.6 | Water wet | 180 | 0.37 | 23 | 6 | 10 | 1449 | 0.8 |

TABLE 3

| ID (INCHES) | A (M) | VGS (M/S) | QG M3/S | QG SMM3/DAY | VLS (M/S) | QL M3/D |
|---|---|---|---|---|---|---|
| 12.00 | 0.07 | 0.00 | 0.00 | 0.00 | 1.30 | 7456 |
| | | 0.50 | 0.03 | 0.41 | 0.98 | 5592 |
| | | 1.00 | 0.07 | 0.82 | 0.65 | 3728 |
| | | 1.50 | 0.10 | 1.23 | 0.33 | 1864 |
| 10.00 | 0.05 | 0.00 | 0.00 | 0.00 | 1.30 | 5079 |
| | | 0.50 | 0.02 | 0.28 | 0.98 | 3809 |
| | | 1.00 | 0.05 | 0.56 | 0.65 | 2539 |
| | | 1.50 | 0.07 | 0.84 | 0.33 | 1270 |
| 8.00 | 0.03 | 0.00 | 0.00 | 0.00 | 1.30 | 3156 |
| | | 0.50 | 0.01 | 0.17 | 0.98 | 2367 |
| | | 1.00 | 0.03 | 0.35 | 0.65 | 1578 |
| | | 1.50 | 0.04 | 0.52 | 0.33 | 789 |

TABLE 4

| ID (") | QL-limit (m³/day) | VLS-limit (m/s) |
|---|---|---|
| 12 | 7773 | 1.36 |
| 10 | 5059 | 1.3 |
| 8 | 2971 | 1.22 |

TABLE 5

| U.mix | WC.range: |
|---|---|
| 0.4 m/s: | 0.19 < WC.pipe < 0.73 |
| 1.0 m/s: | 0.30 < WC.pipe < 0.73 |
| 1.5 m/s: | 0.30 < WC.pipe < 0.60 |
| 2.0 m/s: | 0.48 < WC.pipe < 0.54 |

TABLE 6

| WC | ID (m) | Stratified flow velocity (m/s) | Moving sand bed velocity (m/s) |
|---|---|---|---|
| 0.4 | 0.020 | 0.72 | 0.68 |
| 0.4 | 0.076 | 1.0 | 0.77 |
| 0.4 | 0.254 | 1.31 | 0.90 |
| 0.9 | 0.020 | 0.72 | 0.59 |
| 0.9 | 0.076 | 1 | 0.72 |
| 0.9 | 0.254 | 1.31 | 0.84 |

The invention claimed is:

1. A device for separating fluid from a mixture of multiple fluids having a density, comprising:
   a straight primary pipe having a tubular wall with an inner surface defining a primary flow channel and an opposite outer surface, the pipe having a substantially horizontal central axis, the mixture of multiple fluids flowing through the primary flow channel in a forward direction at a first velocity;
   a plurality of inclined separation channels extending through the tubular wall from the inner surface to the outer surface and being fluidly connected to the primary flow channel for extraction of fluid having a density different from the density of the mixture from the primary flow channel;
   a collection jacket comprising a second cylindrical pipe circumscribing the primary pipe spaced from the outer surface of the tubular wall, defining an annular flow chamber, wherein
   the separation channels fluidly connect the primary flow channel to the annular flow chamber, and
   each of the separation channels extends from the inner surface of the wall to the outer surface of the wall at an inclined angle relative to the central axis, and at least one of the channels has a position at the outer surface that is axially forward relative to a position of the same channel at the inner surface.

2. The device according to claim 1, wherein at least one of the inclined channels defines an inclined central axis that shares a plane with the central axis of the primary flow channel such that the inclined central axis and the central axis of the primary flow channel intersect.

3. The device according to claim 1, wherein each of the inclined channels has a cross section with a shape that is independently selected from rectangular and cylindrical.

4. The device according to claim 1, wherein each of the inclined channels defines a respective inclined central axis that extends at an inclined angle of between 2 and 30 degrees relative to the central axis of the primary flow channel.

5. The device according to claim 1, wherein each of the inclined channels defines a respective inclined central axis and has a diameter measured perpendicular to the respective inclined central axis of the respective inclined channel that is between that is between 3 and 20 mm, and the primary flow channel has a first diameter greater than the diameter of the respective inclined channel that is between 20 and 250 mm.

6. The device according to claim 1, wherein each of the inclined channels is defined by a respective inner channel wall with an inner surface connected to the inner surface of the pipe wall and the inner surface of the pipe wall transitions to a respective inner channel with a rounded surface.

7. The device according to claim 1, wherein the plurality of inclined channels includes a first collection of inclined channels positioned extending through the pipe wall at a bottom portion of the pipe wall for extraction of a first fluid having a density greater than the density of the mixture from the mixture, and a second collection of inclined channels positioned extending through the pipe wall at a top portion of the pipe wall for extraction of a second fluid having a density less than the density of the mixture.

8. The device according to claim 7, wherein the first collection of inclined channels and the second collection of inclined channels are respectively subdivided into groups, and each respective group of inclined channels is enclosed by a collection chamber which collects liquid extracted from each respective group.

9. The device according to claim 8, wherein the respective collection chambers for collection of each extracted fluid comprises an outer cylindrical pipe which is coaxial to the central axis of the flow channel and which encloses a portion of the straight pipe with the respective groups of inclined channels.

10. The device according to claim 1, wherein at least one of the inclined channels has a position at the inner surface that is axially forward relative to a position of the same channel at the outer surface.

11. The device of claim 6, wherein the rounded surface has a radius of curvature that increases as a diameter of the respective inclined channel increases.

12. The device of claim 11, wherein the radius of curvature of the transition is within a range of 5-100 mm and the diameter of the respective inclined channel is within a range of 3-20 mm.

13. The device of claim 9, wherein the collection chamber is sub-divided into two sub-chambers by a horizontal division wall, thereby dividing the collection chamber into a lower sub-chamber and upper sub-chamber, and each of the upper and the lower sub-chambers is further divided by an additional respective division wall to form lower sub-chamber halves and upper sub-chamber halves.

14. The device of claim 13, further comprising a valve joined to a flow path that connects the respective lower sub-chamber and upper sub-chamber to selectively fluidly connect each group to mix the separated fluids.

15. The device of claim 8, further comprising a valve mounted within the flow path to each collection chamber.

16. The device of claim 15, wherein each valve selectively opens and closes a respective inclined channel so that groups of inclined channels can be opened or closed, thereby altering a superficial velocity and a water cut value of the mixture of multiple fluids flowing in primary flow channel.

17. The device of claim 9, wherein the collection chamber is sub-divided into two sub-chambers by a division wall so that the collection chamber is divided into a lower sub-chamber for collection of a first extracted fluid and an upper sub-chamber for collection of a second extracted fluid less dense than the mixture.

18. The device of claim 13, wherein each of the respective sub-chamber halves encloses one group of inclined channels to collect a respective fluid from the respective group.

* * * * *